United States Patent
Branden et al.

(10) Patent No.: US 9,998,446 B2
(45) Date of Patent: Jun. 12, 2018

(54) ACCESSING A CLOUD-BASED SERVICE PLATFORM USING ENTERPRISE APPLICATION AUTHENTICATION

(71) Applicant: Box, Inc., Los Altos, CA (US)

(72) Inventors: Drew Barrett Branden, San Francisco, CA (US); Daniel Theurer, Mountain View, CA (US); Aniket Shivajirao Patil, Milpitas, CA (US); Lev Kantorovskiy, Mountain View, CA (US); Sean Andrew Rose, San Francisco, CA (US); Rachel Kay Lambert, San Francisco, CA (US); Timothy Martin Heilig, Palo Alto, CA (US); Peter Otto Rexer, San Carlos, CA (US); Rory Arend Paap, Palo Alto, CA (US); Charles Boyd Burnette, Wake Forest, NC (US); Vikram Sudhir Sardesai, San Jose, CA (US); Dominic Anton Grillo, Mountain View, CA (US); Wayne Cheng, Fremont, CA (US); Lyall Yatsun Chun, San Jose, CA (US); Steve Hackney, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 202 days.

(21) Appl. No.: 14/838,212

(22) Filed: Aug. 27, 2015

(65) Prior Publication Data
US 2016/0065555 A1 Mar. 3, 2016

Related U.S. Application Data

(60) Provisional application No. 62/043,888, filed on Aug. 29, 2014, provisional application No. 62/150,769, filed on Apr. 21, 2015.

(51) Int. Cl.
H04L 29/06 (2006.01)

(52) U.S. Cl.
CPC .............................. *H04L 63/0807* (2013.01)

(58) Field of Classification Search
None
See application file for complete search history.

(56) References Cited

U.S. PATENT DOCUMENTS

| 8,495,081 B2* | 7/2013 | Junginger | G06F 17/30864 |
| | | | 705/26.7 |
| 9,251,114 B1* | 2/2016 | Ancin | G06F 15/17331 |
| | (Continued) | | |

OTHER PUBLICATIONS

"Using OAuth 2.0 for Server to Server Applications", Aug. 2015, URL: https://developers.google.com/identity/protocols/OAuth2ServiceAccount.

(Continued)

*Primary Examiner* — Christopher Revak
(74) *Attorney, Agent, or Firm* — Vista IP Law Group LLP

(57) ABSTRACT

Systems for managing user-level security in a cloud-based service platform. A server in a cloud-based environment is configured to interface with storage devices that store objects that are accessible over a network by two or more users. An enterprise entity is identified using an enterprise identifier associated with the enterprise, and an application service is associated with an application identifier. An application service request comprising a user identifier and the application identifier is received, and authentication is determined based on the combination of the user identifier and a pre-authenticated application identifier. Once the application service request is authenticated, then specific aspects of the service request are authorized. The integrity of the application identifier is confirmed by locating a secure association of the given application identifier to a pre-shared enterprise (Continued)

identifier. Logging, auditing and other functions can be performed at the user level using the user identifier for user-level tracking.

24 Claims, 18 Drawing Sheets

(56) References Cited

U.S. PATENT DOCUMENTS

| | | | | |
|---|---|---|---|---|
| 9,628,448 | B2* | 4/2017 | Hayton | H04L 63/0428 |
| 2013/0219456 | A1* | 8/2013 | Sharma | H04L 63/0815 |
| | | | | 726/1 |
| 2013/0247142 | A1* | 9/2013 | Nishizawa | G06F 21/604 |
| | | | | 726/1 |
| 2014/0053280 | A1* | 2/2014 | Durazzo | H04L 63/0281 |
| | | | | 726/28 |
| 2014/0130142 | A1* | 5/2014 | Plewnia | G06F 21/335 |
| | | | | 726/5 |
| 2015/0135258 | A1* | 5/2015 | Smith | G06F 21/45 |
| | | | | 726/1 |
| 2015/0156065 | A1* | 6/2015 | Grandhe | H04L 41/5054 |
| | | | | 709/224 |
| 2015/0188927 | A1* | 7/2015 | Santhi | H04L 63/104 |
| | | | | 726/4 |
| 2015/0200971 | A1* | 7/2015 | Nishizawa | G06F 21/604 |
| | | | | 726/1 |
| 2016/0142399 | A1* | 5/2016 | Pace | H04L 63/0815 |
| | | | | 726/4 |

OTHER PUBLICATIONS

"Dropbox Help Center: How do I share folders with other people", 2015, URL: https://www.dropbox.com/help/files-folders/share-with-others.

* cited by examiner

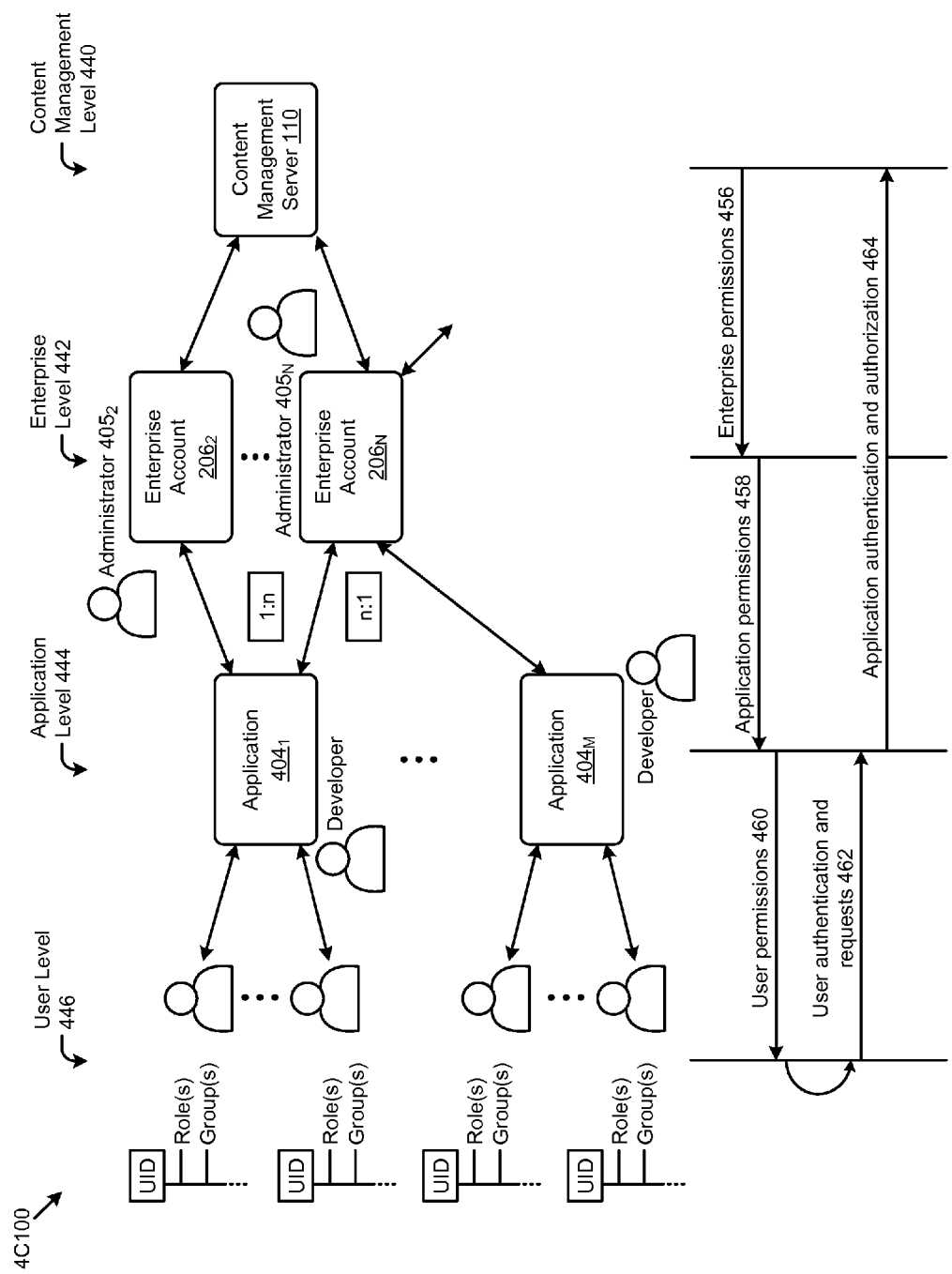
FIG. 4C1

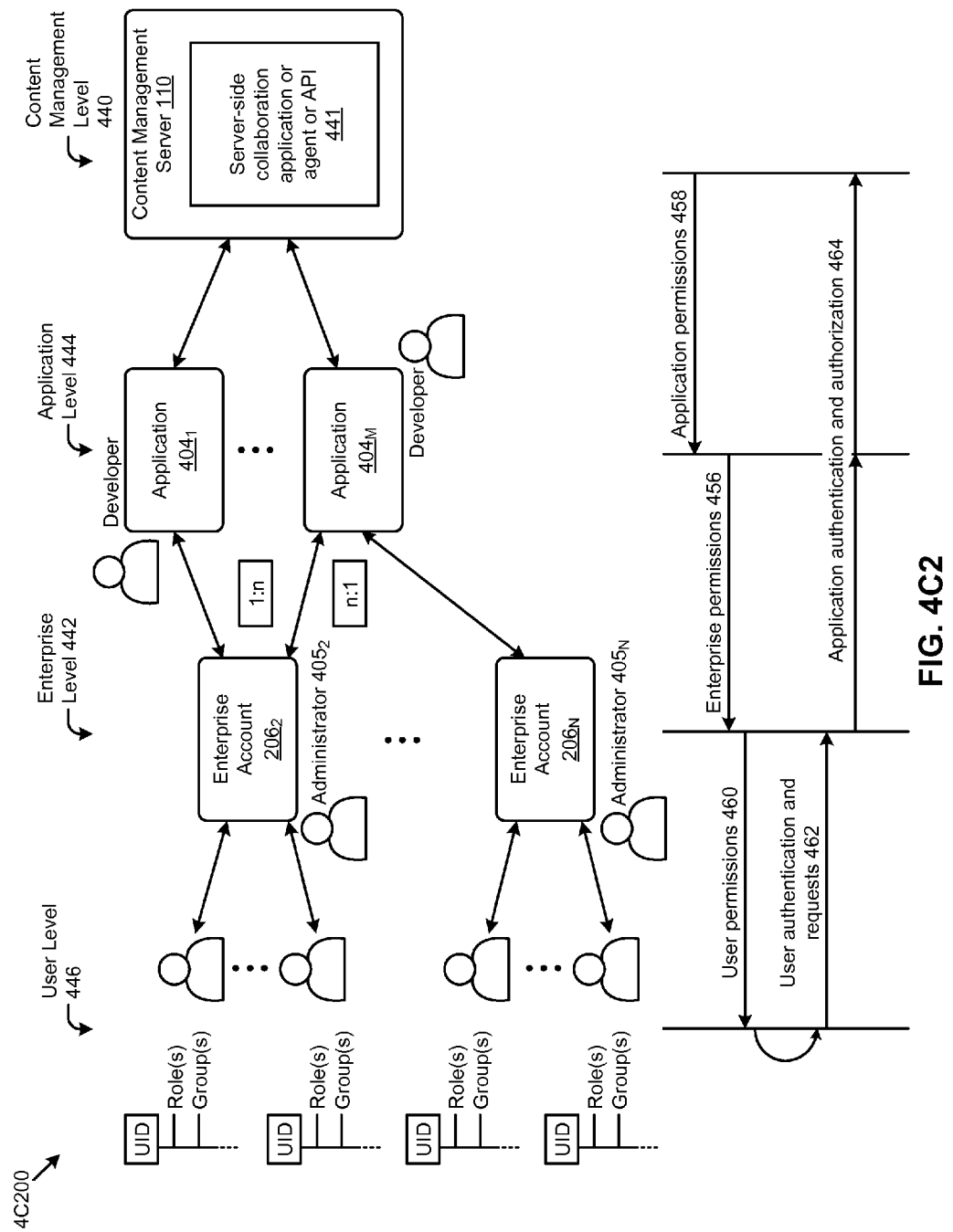
FIG. 4C2

ACCESSING A CLOUD-BASED SERVICE PLATFORM USING ENTERPRISE APPLICATION AUTHENTICATION

RELATED APPLICATIONS

The present application claims the benefit of priority to U.S. Provisional Patent Application Ser. No. 62/043,888 titled, "APPLICATION OWNED CONTENT IN A CLOUD-BASED ENVIRONMENT", filed Aug. 29, 2014, which is hereby incorporated by reference in its entirety; and the present application claims the benefit of priority to U.S. Provisional Patent Application Ser. No. 62/150,769 titled, "ACCESSING A CLOUD-BASED SERVICE PLATFORM USING ENTERPRISE APPLICATION AUTHENTICATION" filed on Apr. 21, 2015, which is hereby incorporated by reference in its entirety.

FIELD

This disclosure relates to the field of managing user-level security in a cloud-based service platform, and more particularly to techniques for accessing a cloud-based service platform using enterprise application authentication.

BACKGROUND

The proliferation of cloud-based services and platforms continues to increase. Specifically, cloud-based content management services and platforms have impacted the way personal and corporate information are stored, and has also impacted the way personal and corporate information are shared and managed. Individuals can avail themselves of such storage and management services to store and share large volumes of personal content objects, such as pictures and videos.

Enterprises (e.g., companies, firms, etc.) might also want to use cloud-based content management platforms to secure, store and manage sensitive proprietary content objects, while enhancing workforce productivity and while enhancing the experience of their customers (e.g., users, vendors, contractors, partners, etc.) when interacting with the online personality of the enterprise. However, challenges can arise for an enterprise when incorporating a cloud-based content management platform into the enterprise business model and operations. In some environments, in particular those environments subject to strict compliance and regulatory requirements (e.g., healthcare, finance, etc.), content security and tracking are vital. For example, regulations and/or certain service-level agreements may require that the enterprise take on the responsibility and control of the content security, tracking, and reporting (e.g., for auditing purposes). In some cases, the enterprise may further want to control and manage the user experience and relationship through one or more software applications developed and/or approved by the enterprise. Further, the enterprise may also want to take advantage of the collaboration components (e.g., tasks, comments, workflow, etc.) delivered by a content management platform. Thus, the enterprise would want to satisfy myriad requirements as for branding and customer experience, while availing themselves to the features of a cloud-based content management platform. In practice, the enterprise would like the customer/user to interface with an application aligned to the presentation of the enterprise's brands, and yet the customer/user would have no awareness that the enterprise is using a third-party cloud-based content management platform.

Legacy approaches to providing content management services to enterprises have several limitations. In one legacy approach, an enterprise customer or user is redirected from an enterprise application to the content management service when a need arises to use or apply one or more of the content management features (e.g., content access, editing, sharing, collaboration, etc.). Such an approach can result in the inconvenience of requiring the user to set up an account with the content management service and to provide a second login (e.g., the first being for the enterprise application) to access the features and content of the service. This legacy approach also limits the scope of control the enterprise can wrest to manage the customer experience and relationship. In some legacy cases, the aforementioned redirection approach inhibits auditing and tracking since the enterprise does not have ownership of the user's personal content and may not have the visibility (e.g., as pertains to workspaces, folders, etc.) necessary to track the user actions. Since the user may login to the content management service both as a user of an enterprise application and a personal user, a potential exists that enterprise and personal content can be intermingled, in turn creating a potential for compromising security, regulatory compliance, and privacy. Merely incorporating any cloud-based service platform into an enterprise environment is still deficient, at least in the sense that a redirection approach remains beholden to the security approach and collaboration features offered by the incorporated cloud-based service platform. In another legacy approach, the enterprise can setup an internal content storage system to enable sharing of content with their users. However, such internal systems have limited security, collaboration, and maintenance features as compared to a cloud-based content management platform.

The problem to be solved is therefore rooted in technological limitations of the legacy approaches. Improved techniques, in particular improved application of technology, are needed to address the problem of incorporating features of a cloud-based service platform into an enterprise application while maintaining enterprise-level branding and security and auditing policies that conform to a given security and/or regulatory requirement, and/or service-level agreement. More specifically, the technologies applied in the aforementioned legacy approaches fail to achieve sought-after capabilities of the herein disclosed techniques for accessing a cloud-based service platform using enterprise application authentication. What is needed is a technique or techniques to improve the application and efficacy of various technologies as compared with the application and efficacy of legacy approaches.

SUMMARY

The present disclosure provides improved systems, methods, and computer program products suited to address the aforementioned issues with legacy approaches. More specifically, the present disclosure provides a detailed description of techniques used in systems, methods, and in computer program products for accessing a cloud-based service platform using enterprise application authentication. Certain embodiments are directed to technological solutions for authenticating and authorizing an application to request content management platform access on behalf of an enterprise and/or on behalf of a user of an enterprise application. The embodiments advance the relevant technical fields as well as advancing peripheral technical fields. In particular, practice of the disclosed techniques reduces use of computer memory, reduces demand for computer processing power, and reduces communication overhead needed for incorporating features of a cloud-based service platform into an enterprise application, while maintaining enterprise-level branding, and security and auditing policies that conform to a given security and/or regulatory requirement, and/or confirm to a given service-level agreement. For example, the disclosed embodiments enable users of enterprise applications and other users to collaborate on the same content store in real time, in turn enabling collaboration with less resources, less time, and greater security. Further, the herein disclosed techniques reduce the resources and time required to integrate the cloud-based service platform into the enterprise application, and reduce the resources and time required to maintain and certify (e.g., to be compliant with regulations) the integrated service platform. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in the technical fields of distributed storage.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 4C1 and FIG. 4C2 present logical diagram of proxy techniques as used in systems for accessing a cloud-based service platform using enterprise application authentication, according to some embodiments.

DETAILED DESCRIPTION

Figure 1A:
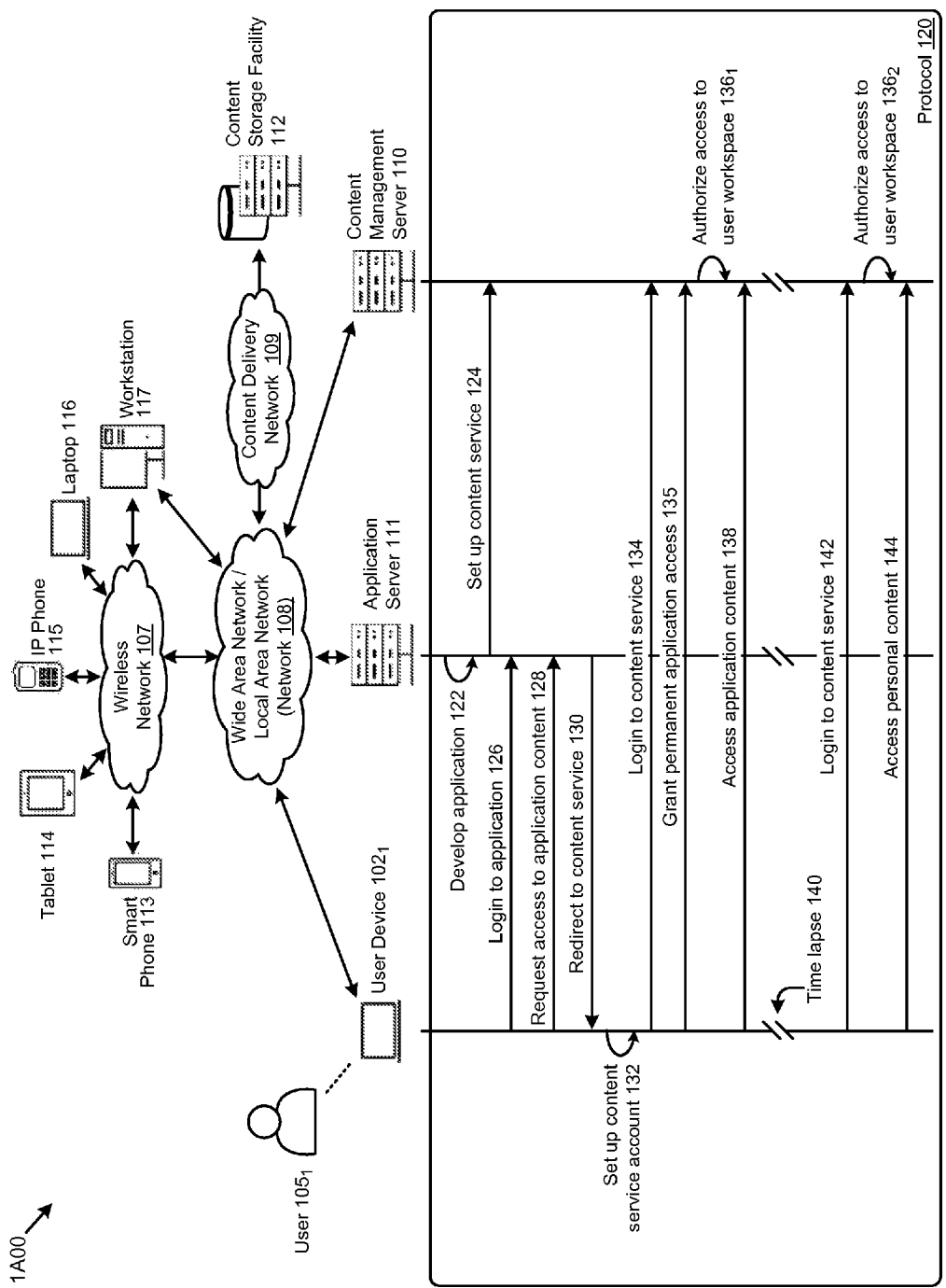
FIG. 1A depicts an environment for accessing a cloud-based service platform.

Some embodiments of the present disclosure address the problem of incorporating features of a cloud-based service platform into an enterprise application while maintaining enterprise-level branding, security, auditing, and content ownership policies that conform to a given security policy, regulatory policy, and/or a given service-level agreement. Some embodiments are directed to approaches for authenticating and authorizing an application to request content management platform access on behalf of an enterprise and/or user of an enterprise application. More particularly, disclosed herein and in the accompanying figures are exemplary environments, systems, methods, and computer program products for accessing a cloud-based service platform using enterprise application authentication.

Overview

Enterprises (e.g., companies, firms, start-ups, etc.) might also want to use cloud-based content management platforms to secure, store and manage sensitive proprietary content while enhancing workforce productivity and while enhancing the experience of their customers (e.g., users, vendors, contractors, partners, etc.) when interacting with the online personality of the enterprise. For example, the enterprise may want to control and manage the user experience and relationship through one or more software applications developed and/or approved by the enterprise. The enterprise needs to satisfy myriad requirements as for branding and customer experience and/or security and regulatory compliance, while availing themselves to the features of a cloud-based content management platform. In practice, the enterprise would like the customer/user to interface with an application aligned to the presentation of the enterprise's brands, and yet the customer/user would have no awareness that the enterprise is using a third-party cloud-based content management platform.

To address the need for incorporating features of a cloud-based service platform into an enterprise application while maintaining enterprise-level branding, and security, regulatory, and auditing policies that conform to a given service-level agreement, the techniques described herein discuss (1) a protocol for communication between an enterprise application and cloud-based service platform; (2) a masking technique for providing enterprise control of the customer experience (e.g., user interface, user experience, branding, etc.), even though a cloud-based service platform is in use; and (3) use of secure electronic communications techniques (e.g., JSON web token objects, time limited access tokens, public-private keys, etc.) while implementing the aforementioned protocol and masking technique.

Use of the aforementioned techniques serves to enable an application to securely take actions on behalf of a user of the application while maintaining a user-based authentication and permissions model, and further enables a user of an enterprise's applications to simultaneously collaborate with employees of the enterprise that is leveraging a content management service. For example, a "white label" implementation of a cloud-based content management platform enables multiple enterprise applications to access the same content store while still allowing those enterprises to own their content. Users can be users of a single enterprise's white label cloud-based content management platform. Or, users can be authenticated through a single application that is sanctioned by multiple enterprises.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts an environment 1A00 for accessing a cloud-based service platform. As an option, one or more instances of environment 1A00 or any aspect thereof may be implemented in the context of the architecture and functionality of the embodiments described herein. Also, the environment 1A00 or any aspect thereof may be implemented in any desired environment.

As shown in FIG. 1A, environment 1A00 comprises various computing systems (e.g., servers and devices) interconnected by a wireless network 107, a network 108, and a content delivery network 109. The wireless network 107, the network 108, and the content delivery network 109 can comprise any combination of a wide area network (e.g., WAN), local area network (e.g., LAN), cellular network, wireless LAN (e.g., WLAN), or any such means for enabling communication of computing systems. The wireless network 107, the network 108, and the content delivery network 109 can also collectively be referred to as the Internet. The content delivery network 109 can comprise any combination of a public network and a private network. More specifically, environment 1A00 hosts a shared storage facility that comprises at least one instance of a content management server 110, at least one instance of an application server 111, and at least one instance of a content storage facility 112. The servers and storage facilities shown in environment 1A00 can represent any single computing system with dedicated hardware and software, multiple computing systems clustered together (e.g., a server farm), a portion of shared resources on one or more computing systems (e.g., virtual server), or any combination thereof. For example, the content management server 110 and the content storage facility 112 can comprise a cloud-based content management platform that provides content management services. Environment 1A00 further comprises an instance of a user device $102_1$ that can represent one of a variety of other computing devices (e.g., a smart phone 113, a tablet 114, an IP phone 115, a laptop 116, a workstation 117, etc.) having hardware and software (e.g., an application) capable of processing and displaying information (e.g., web page, graphical user interface, etc.) and communicating information (e.g., web page request, user activity, electronic files, etc.) over the wireless network 107, the network 108, and the content delivery network 109. As shown, the user device $102_1$ can be operated by an instance of a user $105_1$.

As shown, the user device $102_1$, the application server 111, and the content management server 110 can exhibit a set of high-level interactions (e.g., operations, messages, etc.) in a protocol 120. Specifically, the protocol 120 can represent interactions in systems for providing users of enterprise applications access to cloud-based service platforms using legacy techniques. As shown, an application (e.g., associated with an enterprise) can be developed and operated by the application server 111 (see operation 122). The application can be further set up to operate with a content service operated by the content management server 110 (see message 124). When the application is available, the user $105_1$ can login to the application from a client user device such as user device $102_1$ (see message 126) and request access to content related to the application (see message 128). The application server 111 can respond to the request by redirecting the user $105_1$ to the content management service (see message 130). For example, the user $105_1$ may be presented a new user interface provided by the content management service on the user device $102_1$. To authenticate and authorize the user $105_1$ to access the application content, the user $105_1$ may be required to set up an account with the content management service, if one does not already exist (see operation 132). When the account is established, the user $105_1$ can login directly to the content management service (see message 134) and grant the application permanent access to the user's content (see message 135). For example, the user $105_1$ might receive an alert on user device $102_1$ that asks "Would you like to provide the XYZ application access to your account?". The user $105_1$ and application can then be authorized to access a user workspace (see operation $136_1$) for accessing (e.g., creating, reading, updating, deleting, uploading, downloading, etc.) content associated with the application (see message 138). In some cases, the access can be initiated by calls from the application on behalf of the user $105_1$. After a time lapse 140, the user $105_1$ may login directly to the content management service for personal purposes (see message 142). For example, the user $105_1$ may, for personal purposes, login using the same email address and password (see message 142) as was used for enterprise application access (see message 134). The user $105_1$ can then be authorized by the content management service at the content management server 110 (see operation $136_2$) and can then access personal content (see message 144).

The legacy approach depicted in protocol 120 has several limitations. For example, the protocol 120 comprises the inconvenience of requiring the user $105_1$ to set up an account with the content management service and to provide a second login. This legacy approach also limits the control of the enterprise associated with the application operated on the application server 111 to manage the user experience and relationship, as well as track the activity of the user and associated application content as the user $105_1$ interacts directly, at least part of the time, with the content management service operated on the content management server 110. It is possible that the user $105_1$ uses the content management service both as a user of the enterprise application and also as a user for the user's personal content management purposes. As such, a potential exists that application and personal content can be intermingled which, in turn, can potentially compromise security, regulatory compliance, and privacy. An approach for accessing a cloud-based service platform using enterprise application authentication is shown and described as pertains to FIG. 1B.

Figure 1B:
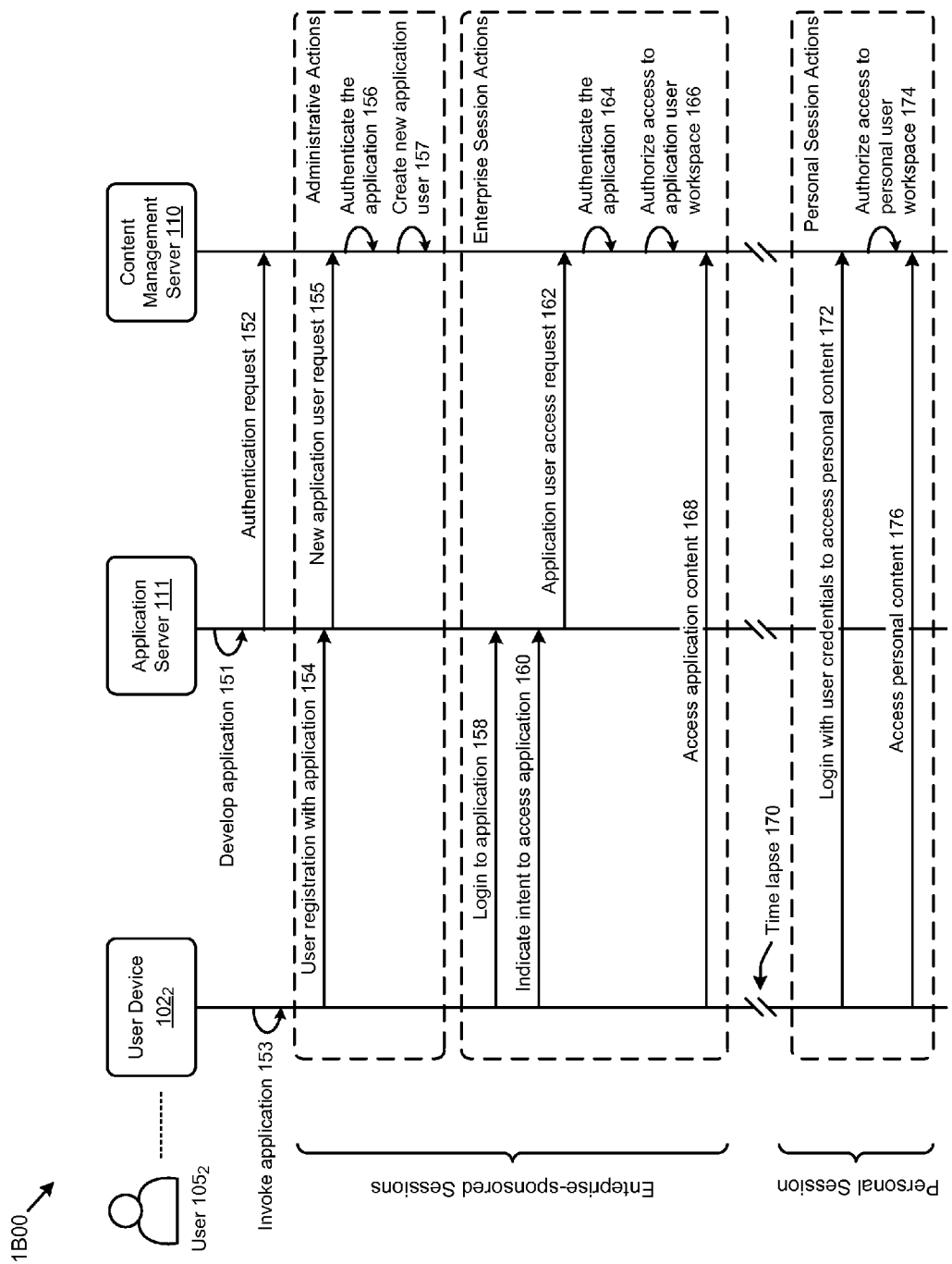
FIG. 1B depicts a protocol implemented by system components for accessing a cloud-based service platform based on enterprise-level application authentication, according to some embodiments.

FIG. 1B depicts a protocol 1B00 implemented by system components for accessing a cloud-based service platform based on enterprise-level application authentication. As an option, one or more instances of protocol 1B00 or any aspect thereof may be implemented in the context of the architecture and functionality of the embodiments described herein. Also, the protocol 1B00 or any aspect thereof may be implemented in any desired environment.

In one embodiment, a user device $102_2$, the application server 111, and the content management server 110 can exhibit a set of high-level interactions (e.g., operations, messages, etc.) in the protocol 1B00. In this case, the user device $102_2$ is operated by a user $105_2$. The herein disclosed approach and techniques can distinguish between the user $105_2$ in the role of a user of an enterprise application accessing content related to the application, and the user $105_2$ in the role of a user accessing personal content. For example, in some embodiments, the user $105_2$ can access content managed by the content management platform through an enterprise application, and can also access personal content from within the content management platform (e.g., without intermingling between the enterprise application content and the personal content). More specifically, the user $105_2$ can use the protocol 1B00 for accessing a cloud-based service platform using enterprise application authentication. As shown, an application (e.g., associated with an enterprise) can be developed and operated by the application server 111 (see operation 151). The application can then be authenticated and authorized to perform various enterprise-sponsored sessions (see message 152), such as user management tasks (e.g., application user creation) and user action operations (e.g., content access). For example, the application can be provided certain privilege grants to allow the application to operate certain features of the content management platform. In some cases, privilege grants of a particular scope are granted to the application by the enterprise, and in other cases, such privilege grants of a different scope are provided to the application to operate on behalf of the enterprise and/or on behalf of authorized users of the application. For example, a certain enterprise can establish an enterprise account with a content management service provider and a given application can have an access scope determined by the enterprise account. In some embodiments, multiple applications can be associated with one enterprise (e.g., a suite of health care applications associated with a single health care provider), and in other embodiments, multiple enterprises can be associated with one application (e.g., a travel booking application associated with multiple lodging providers).

When the application is available and authenticated, the user $105_2$ can invoke the application on user device $102_2$ (see operation 153) and register with the application (see message 154). In response to the aforementioned actions by the user $105_2$, the application server 111 can generate a request to create a new application user (see message 155). The content management server 110 can authenticate the application and corresponding request (see operation 156), and create a new application user (see operation 157). In one or more embodiments, the application user role is recognized by the content management service as being associated with the user $105_2$ in the context of the enterprise application. In exemplary cases, no personally identifiable information related to user $105_2$ (e.g., email address, password, etc.) is passed on the exchange between the application server and the content management server. In some cases, the application user role can have a user code or screen name attribute selected by the user $105_2$. Further, the application is authorized to request the new application user creation for the application and associated enterprise based, in part, on the prior authentication (see message 152). When the user $105_2$ has an application account and an associated application user recognized by the content management service, the user $105_2$ can login to the application from the user device $102_2$ (see message 158) and can indicate an intent to access user-specific content related to the application (see message 160). In response to the need for access, a request for user access to application content can be sent by the application operated by the application server 111 to the content management service operated by the content management server 110 (see message 162). The request for access can invoke a further authentication of the requesting application (see operation 164) and the request can include a specific or implied request for an authorization to access the workspace of the user $105_2$ (see operation 166). Successful authentication results in the content management server providing that user access to the application content at user device $102_2$ (see message 168). In some cases successful authorization and access also enables features, which can be passed to the associated application and enterprise, and which can in turn be presented to the user $105_2$. Features provided by the content management service include but are not limited to auditing operations, collaboration tasks, comment features, workflow access, observation of sets of permissions, aspects of membership in groups, management and observance of retention policies, assignments of content-specific security parameters, etc. After a time lapse 170, the user $105_2$ may invoke a personal session to access personal content by logging in directly with the content management service (see message 172). In this case, the user $105_2$ will be authorized for access to his or her personal content workspace using login credentials provided by the user $105_2$ (see operation 174 and message 176).

The herein disclosed approach for accessing a cloud-based service platform based on enterprise-level application authentication depicted in protocol 1B00 has several advantages. For example, the user $105_2$ need only provide a single sign on (e.g., single login) to access application content managed by the content management service. Further, the user $105_2$ is not aware of the content management platform operating behind the application, and experiences only the interface provided by the application and/or enterprise. Also, all content access activity of the user $105_2$ as pertains to communications between the application and the content management service can be tracked and/or audited by the content management server (e.g., see message 162). The personal content of the user $105_2$ (e.g., accessed directly with the content management service) is not intermingled with the application content associated with the user $105_2$. Such separation of content is based, in part, on the dissociation of personally identifiable information (e.g., email address, login credentials, etc.) from the application user role used by the application to request access from the content management service. The aforementioned advantages and other capabilities are enabled, in part, by the herein disclosed techniques for authenticating and authorizing an application to perform various user management and user action operations. One embodiment of a system for implementing such techniques is shown in FIG. 2A.

Figure 2A:
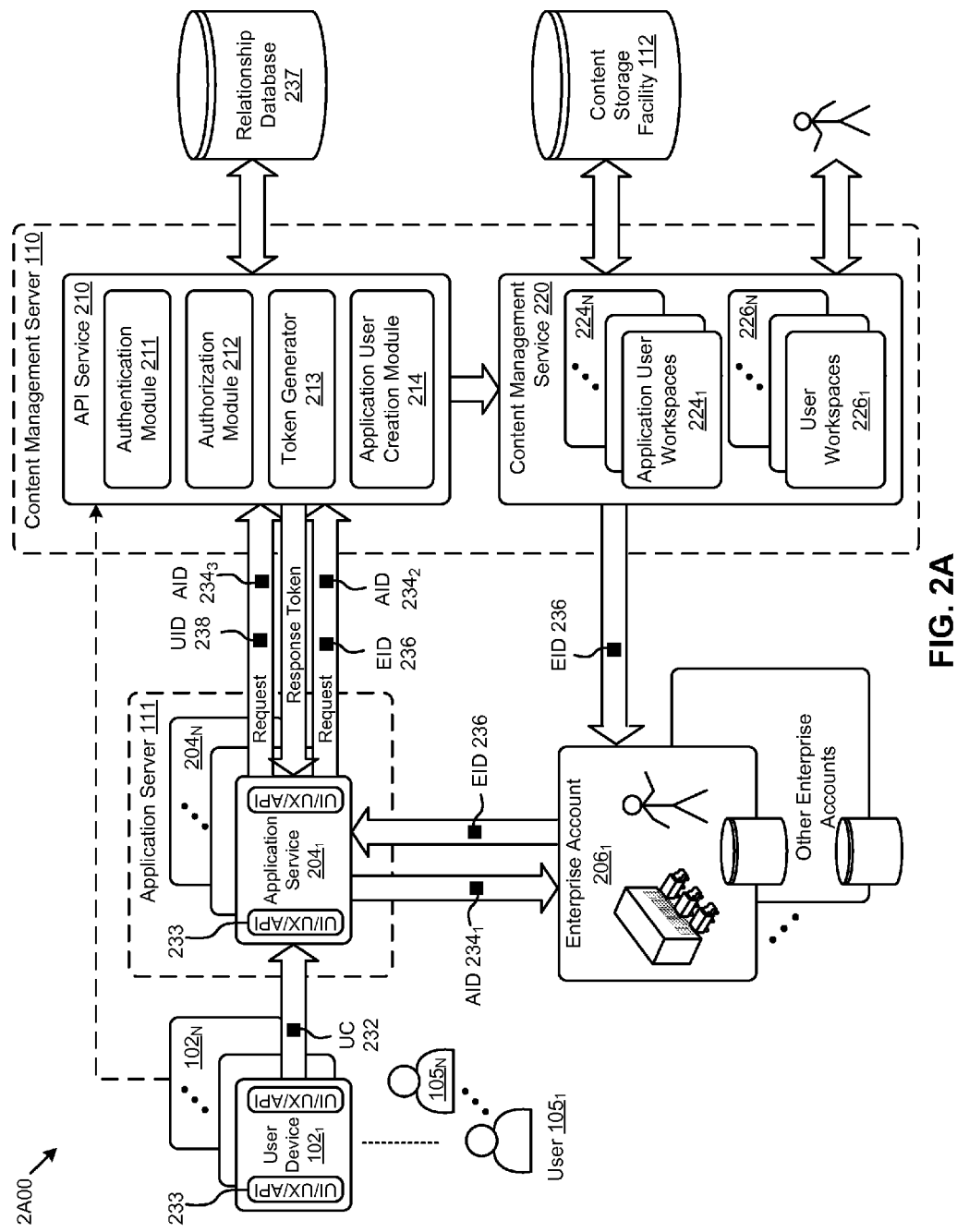
FIG. 2A presents a block diagram of a system for accessing a cloud-based service platform using enterprise application authentication, according to an embodiment.

FIG. 2A presents a block diagram of a system 2A00 for accessing a cloud-based service platform using enterprise application authentication. As an option, one or more instances of system 2A00 or any aspect thereof may be implemented in the context of the architecture and functionality of the embodiments described herein. Also, the system 2A00 or any aspect thereof may be implemented in any desired environment.

The system 2A00 shown in FIG. 2A presents an example embodiment of various modules for implementing the herein disclosed techniques. The embodiment includes one or more instances of a content management server 110 and the application server 111. Functions of the modules can be accessed by an application programming interface (API) and/or, an API call can invoke services (e.g., API services). Specifically, the content management server 110 can operate an API service 210 comprising an authentication module 211, an authorization module 212, a token generator 213, and an application user creation module 214. The content management server 110 can also operate a content management service 220 comprising content access applications to access a plurality of application user workspaces (e.g., application user workspace $224_1$ to application user workspace $224_N$) and a plurality of user workspaces (e.g., user workspace $226_1$ to user workspace $226_N$). More specifically, the workspaces managed by the content management service 220 represent secure collections of content (e.g., stored on the content storage facility 112) accessible by a respective user (e.g., application users of application user workspaces, enterprise users of workspaces, knowledge worker users of workspaces, etc.). The content management service 220 uses the workspaces, in part, to deliver various layers of content management capabilities to the users. Such content management capabilities include, but are not limited to, permissions and security, auditing and tracking, collaboration capabilities (e.g., commenting capabilities, task invocation capabilities, sharing capabilities, etc.), and other capabilities. Also, any number of application servers can operate a plurality of application services (e.g., application service $204_1$ to application service $204_N$) that can interact with a plurality of enterprise accounts (e.g., see example of enterprise account $206_1$), and a plurality of user devices (e.g., user device $102_1$ to user device $102_N$) operated by a plurality of application users (e.g., user $105_1$ to user $105_N$). In one or more embodiments, one or more application services can operate on the plurality of user devices. Also, in some cases, one user can operate one or more user devices and, in other cases, one or more users can operate one user device. Further, in some cases, one application service can be associated with one or more enterprise accounts, and in other cases, one or more application services can be associated with one enterprise account. Still further, more than one instance of the application services can be associated with one enterprise account, and any instances of the application services can be associated with respective application identifiers.

The system 2A00 further illustrates a portion of the data structures that can be used (e.g., communicated in messages between modules, devices, services and accounts) in implementing the herein disclosed techniques for accessing a cloud-based service platform using enterprise application authentication. Specifically, the enterprise account $206_1$ can receive an enterprise identifier (e.g., a code) in the form of, or derived from, an enterprise credential or enterprise ID (e.g., EID 236). As shown, an EID can be assigned by an operator or IT person at the firm that operates the content management service. A representative (e.g., IT administrator) of the enterprise account $206_1$ can receive an application identifier or application ID (e.g., AID $234_1$) uniquely associated with the application service $204_1$ and grant the application ID permission to access the enterprise account $206_1$ and create and manage application users associated with that enterprise (e.g., by providing the enterprise ID to the application service $204_1$). A data structure can store any number of application IDs that are mapped (e.g., in a many-to-one relationship) to an enterprise ID. Strictly as one example, an EID/AID relationship can be stored in one or more instances of relationship database 237). In some embodiments, the relationship database the application ID can comprise a relationship between a client ID and a client secret such as is associated with the OAuth 2.0 authentication protocol. When the application service $204_1$ is established, the user $105_1$ can use the user device $102_1$ to login to the application service with a predefined (e.g., user-defined, or partially user-defined) set of user login codes (e.g., account number and PIN, or user's email alias and passcode) or other set of user credentials (e.g., see UC 232). If the user $105_1$ is a new user, the application service $204_1$ will communicate with the API service 210 (e.g., the application user creation module 214) to create a new application user and assign a user identifier or user ID (e.g., UID 238) uniquely associated with the user $105_1$. Having then a user identifier or user ID, any user-based functionality (e.g., auditing, content separation, compliance features, commenting features, tasks, sharing, collaboration, etc.) are made available to the user.

An application user can be a real person, or can be a device. For example, consider a retail application that runs on multiple iPads in each retail location. Each iPad could be tied to a specific application user, so that the retail company can monitor and perform analytics on the actions taken by each individual iPad.

In some embodiments, instances of the application service may implement or use portions of a pre-defined set of interface API code 233. Such interface API code can implement features pertaining to presentation and use of user interface screen devices (e.g., widgets) and/or such interface API code can implement pre-packaged API call and callback code. Use of the pre-defined set of interface API code 233 facilitates rapid integration between the enterprise environment (e.g., the supplication service) and API service. Further, use of the pre-defined set of interface API code 233 facilitates rapid implementation of a consistent regime for enterprise user interfaces for accessing the content storage facility.

To invoke authentication and authorization (e.g., using the authentication module 211 and the authorization module 212, respectively) of the application service 204$_1$ for user management operations and in order to receive an enterprise access token, the application service 204$_1$ will communicate with the API service 210 using a message comprising at least a portion of the enterprise ID (e.g., EID 236) and at least a portion of the application ID (e.g., AID 234$_2$). To invoke authentication and authorization of the application service 204$_1$ for user action operations (e.g., the user 105$_1$ requires access to application content) and receive a user access token, the application service 204$_1$ will communicate with the API service 210 using a message comprising at least a portion of the application ID (e.g., AID 234$_3$) and the user ID (e.g., UID 238). For example, a message (e.g., service request, HTTP POST request) from the application service 204$_1$ to the API service 210 can comprise one or more JSON Web Token (JWT) objects representing an encoded JSON Web Signature (JWS). In some cases, the message can originate from the user device 102$_1$ and be delivered directly to the API server 210, bypassing the application service 204$_1$. Specifically, in an example enterprise access token request, the JWT and other portions of the request can be encoded with a public-private key pair (e.g., using a 256-bit RSA algorithm or a 1024-bit RSA algorithm, or using a SHA-256 algorithm, etc.), and can comprise the following JWT claim set structure as shown in Table 1 (e.g., with AID=2234, EID=2236, and UID=2238). The associated message (e.g., POST request) comprising the JWT structure can also include a client ID, a client secret, and a grant type.

TABLE 1

| Ref | JWT Claim Set |
|---|---|
| 1 | {"iss":"2234", |
| 2 | "sub":"2236" |
| 3 | "sub_type":"manage_enterprise" |
| 4 | "aud":"https://api.cms.com/oauth2/token" |
| 5 | "jti":"de305d54-75b4-431b-adb2-eb6b9e546014" |
| 6 | "exp":"2015-04-10T13:34:30Z" |
| 7 | "iat":"2015-04-10T12:34:30Z" |
| 8 | "nbf":"2015-04-10T12:34:30Z"} |

If the request and JWT claim set are authenticated and authorized (e.g., by the authentication module 211 and the authorization module 212, respectively), the API service 210 can return an access token (e.g., enterprise access token, user access token, etc.) created and managed by the token generator 213 to establish a secure communications link between the application service 204$_1$ and the API service 210. Further, and as shown in Table 1 (e.g., see Ref 6, "exp"), such tokens can be temporary (e.g., not valid after the expiration time) to provide additional security. For example, a certain first token can have an issued at time (e.g., "iat") of 2015-04-10T12:34:30Z and an expiration time (e.g., "exp") of 2015-04-10T13:34:30Z (e.g., one hour later). When the first token expires, the first token can no longer be used to authenticate and/or authorize actions and operations, and a new token must be issued (e.g., by the token generator 213) to continue session communications. In some embodiments, the new token can be generated and made available without interruption to the secure communications link between the application service 204$_1$ and the API service 210 earlier established. Such a process of replacing expired tokens with newly created tokens can continue while the entities associated with the secure link (e.g., users, applications, enterprises, etc.) remain authenticated and authorized. Further, in one or more embodiments, the expiration of a first token established with a first combination of user device and application service will not invalidate a second token established with a second combination of user device and application service. Further details describing the application service authentication process is described as pertains to FIG. 3.

Figure 2B:
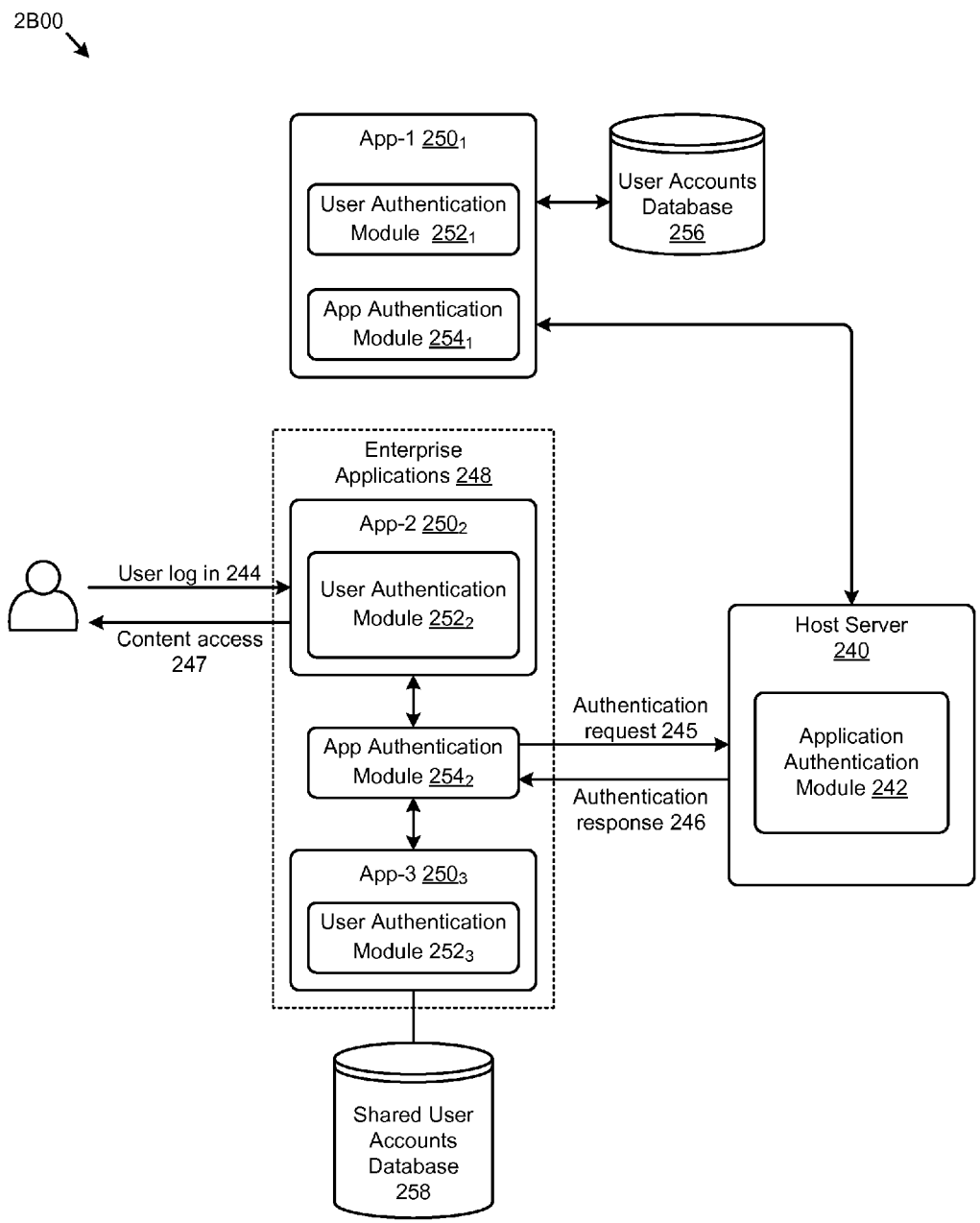
FIG. 2B depicts a diagram of a technique for employing an application token to communicate with a host server in systems for accessing a cloud-based service platform using enterprise application authentication, according to an embodiment.

FIG. 2B depicts a diagram 2B00 of a technique for employing an application token to communicate with a host server in systems for accessing a cloud-based service platform using enterprise application authentication. As an option, one or more instances of the diagram 2B00 or any aspect thereof may be implemented in the context of the architecture and functionality of the embodiments described herein. Also, the diagram 2B00 or any aspect thereof may be implemented in any desired environment.

As illustrated, multiple third-party applications (e.g., App-1 250$_1$, App-2 250$_2$, and App-3 250$_3$) can serve as client-side collaboration applications, and can connect to and communicate with a host server 240 (e.g., content management server 110). A third-party application is provided by an enterprise. In some embodiments, an enterprise can provide a family of enterprise applications 248 (e.g., App-2 250$_2$ and App-3 250$_3$) that can leverage the same user base by having a shared common user accounts database (e.g., shared user accounts database 258) and an application authentication module 254$_2$ that is common to the enterprise applications 248. The communication is through a wired or wireless network (e.g., wireless network 107, network 108, content delivery network 109, etc.). App-1 250$_1$ can manage its own users and as such, App-1 250$_1$ can maintain its own instance of a user accounts database 256 to store user account data (e.g., user ID, user name, or other user characteristics). App-1 250$_1$ can also include a user authentication module 252$_1$ in some embodiments to authenticate its users in its own environment using any suitable authentication techniques, and an application authentication module 254$_1$ according to the disclosed technology. App-2 250$_2$ and App-3 250$_3$ can each have their own instance of a user authentication module (e.g., user authentication module 252$_2$ and user authentication module 252$_3$, respectively) or can share a common user authentication module in some embodiments. The host server 240 can also include an application authentication module 242.

As illustrated, a user of App-2 $250_2$ can log in to App-2 $250_2$ using a set of user credentials (see message 244), such as a user ID and password. The user authentication is handled by the user authentication module $252_2$ of App-2 $250_2$. App-2 $250_2$ can have a set of content associated with the user stored in a data store of a cloud-based platform that includes the host server 240. In order to provide the user a set of content that the user is permitted to view, App-2 $250_2$, via the application authentication module $254_2$, can send an authentication request (see message 245) to the host server 240. In some embodiments, the request can be an API call and can include a token identifying App-2 $250_2$ (e.g., an AID) and can in some embodiments include an identifier (e.g., a UID) associated with the requesting user. The application authentication module 242 of the host server 240 can receive and parse the request to extract details of the request. The application authentication module 242 can then uniquely identify and authenticate App-2 $250_2$. If the authentication is successful, the host server 240 can send an authentication response (see message 246) indicating successful authentication and providing App-2 $250_2$ access to the set of content associated with the requesting user. The user can then receive access to the set of content stored at the cloud-based platform through App-2 $250_2$ (see message 247). In some embodiments, the type of access that the user can have can depend on the access level of the user granted by the enterprise, permissions imposed on specific folders or types of content, or the like. For example, if the user has "read-only" access, the user can browse through the folders and sub-folders and access files stored at the cloud-based platform directly from App-2 $250_2$. However, the user cannot edit or modify any of the items.

Figure 2C:
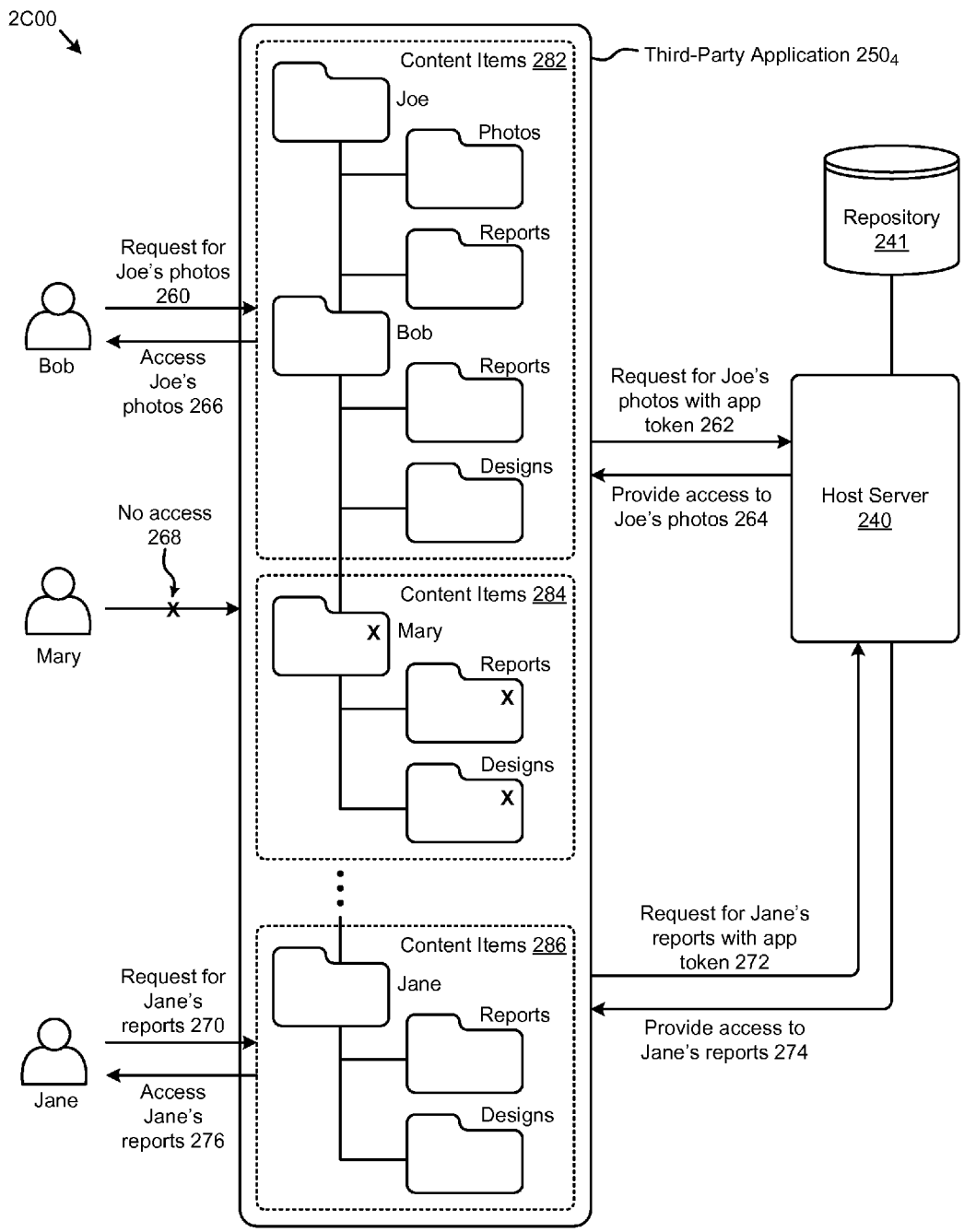
FIG. 2C depicts a diagram of a technique for accessing of items stored at a cloud-based service platform using enterprise application authentication, according to an embodiment.

FIG. 2C depicts a diagram of a technique for accessing of items stored at a cloud-based service platform using enterprise application authentication. As an option, one or more instances of the diagram 2C00 or any aspect thereof may be implemented in the context of the architecture and functionality of the embodiments described herein. Also, the diagram 2C00 or any aspect thereof may be implemented in any desired environment.

As illustrated, a third-party application $250_4$ owns content items of user Joe and user Bob (e.g., content items 282), user Mary (e.g., content items 284), and user Jane (e.g., content items 286), among others, and the content items are stored (e.g., in a repository 241) at a cloud-based platform comprising the host server 240 (e.g., content management server 110). The third-party application $250_4$ can authenticate itself with the host server 240 and obtain an application token that can be used for subsequent communication with the host server 240. When user Bob sends a request to access photos of user Joe (see message 260), in some embodiments, the third-party application $250_4$ can send the request along with the application token (see message 262) to the host server 240. The host server 240 can determine if user Bob is permitted to view the photos of user Joe, and if so, user Bob can be provided access to the photos of user Joe via the third-party application $250_4$ (see message 264 and message 266).

The third-party application $250_4$ can manage its users. For example, the third-party application can delete user Mary. In this case, the content items 284 associated with user Mary cannot be accessed by user Mary (see message 268). In some embodiments, the content items 284 of user Mary can remain in the cloud-based platform and can be accessed by other users based on permissions, as the content items 284 are owned by the third-party application. In other embodiments, access to the content items 284 by other users can be revoked when user Mary is deleted. Also illustrated in FIG. 2C is a scenario in which user Jane requests her own reports (see message 270). In this case, the third-party application $250_4$ can send a request for Jane's reports along with the application token (see message 272). The host server 240 can provide access to Jane's reports and Jane can access the reports via the third-party application $250_4$ (see message 274 and message 276).

Figure 3:
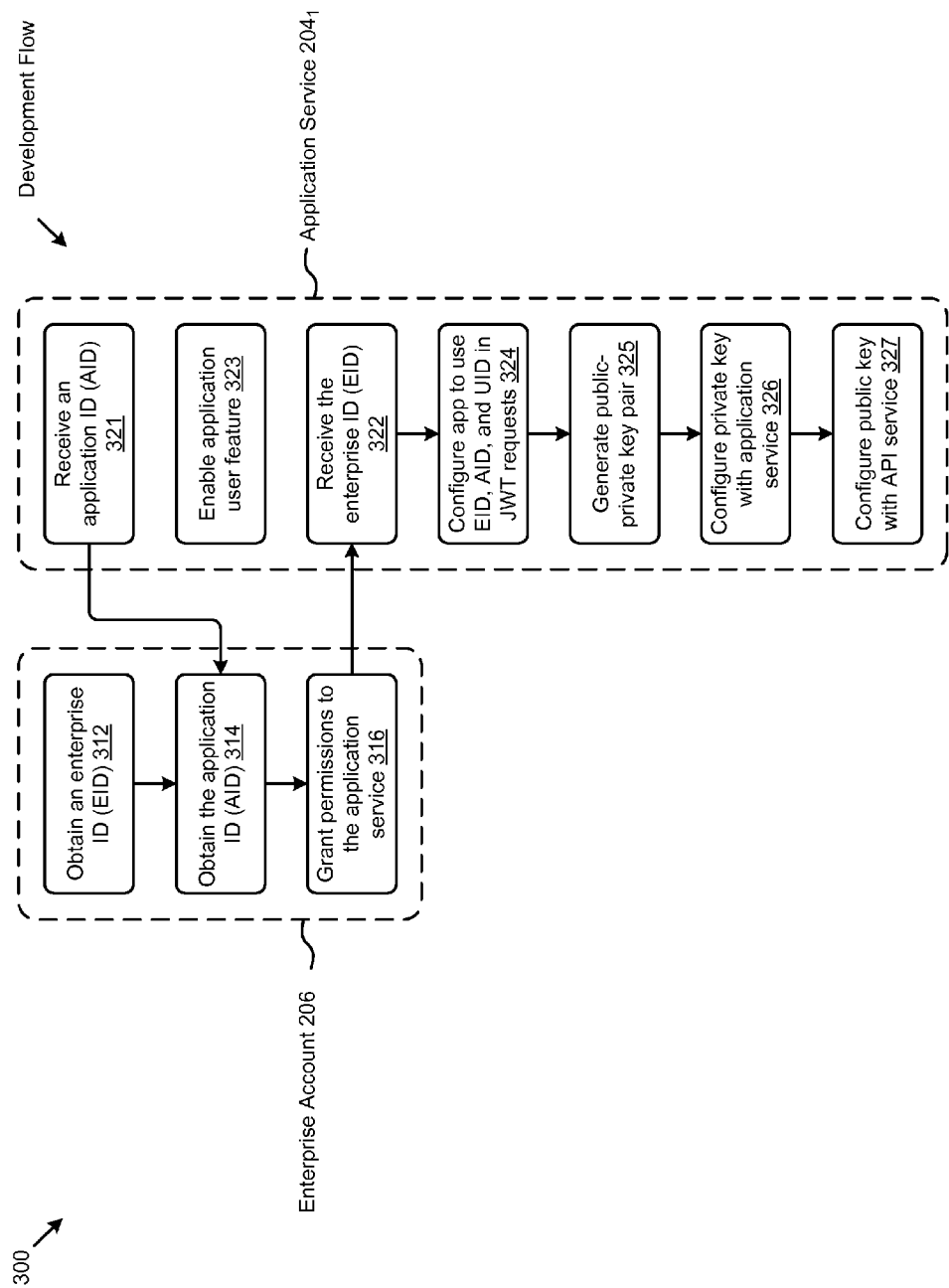
FIG. 3 is a flow diagram illustrating an application development and integration technique used in systems for accessing a cloud-based service platform using enterprise application authentication, according to some embodiments.

FIG. 3 is a flow diagram illustrating an application development and integration technique 300 used in systems for accessing a cloud-based service platform using enterprise application authentication. As an option, one or more instances of the application development and integration technique 300 or any aspect thereof may be implemented in the context of the architecture and functionality of the embodiments described herein. Also, the application development and integration technique 300 or any aspect thereof may be implemented in any desired environment.

The application development and integration technique 300 shown in FIG. 3 comprises a set of operations that can be executed by a representative (e.g., IT administrator) of the enterprise account and the application service $204_1$ described in FIG. 2. Additional or fewer steps and/or other allocations of operations are possible. For example, the developers and/or owners of the application service $204_1$ can be part of the enterprise account organization, or the developers and/or owners of the application service $204_1$ can be separate from the enterprise account organization (e.g., a software company providing a service to multiple enterprises and creating application users at each of those enterprises). Specifically, the application development and integration technique 300 can be used to prepare an application to operate on behalf of a user and/or enterprise in systems for accessing a cloud-based service platform using enterprise application authentication. More specifically, the application development and integration technique 300 can start with the enterprise account obtaining an EID (see step 312). For example, the enterprise account can obtain the EID from a cloud-based content management service provider with the intent of establishing content access using enterprise application authentication. Upon completion of the application service $204_1$ development, the application service $204_1$ can receive an AID (e.g., client ID) from the content management service provider (see step 321). The enterprise account can then obtain the AID (see step 314) and grant permissions to the application service $204_1$ to operate on behalf of the enterprise (see step 316). In exemplary embodiments, the application service has access to authenticating credentials in the form of a client ID and client secret (e.g., from the content management service), however it need not provide such authenticating credentials to the enterprise. For example, and as shown, the application service $204_1$ provides an application ID to the enterprise, and the enterprise in turn provides the application ID and their enterprise ID to the application service to use in making requests. The enterprise can grant this access using the application ID (see step 316) the enterprise does not have access to or perform authentication using credentials involving the client secret. Service requests emanating from the authorized application can be authenticated using the application ID (e.g., AID $234_3$)—the client secret is not needed to emit an authenticatable and authorizable service request.

The developers developing the application service $204_1$ can receive the EID (see step 322) and enable the application user feature in the application service $204_1$ (see step 323). For example, the application user feature can allow the application service $204_1$ to work with the API service 210 to create new application users and manage application user actions (e.g., requests for content access) using the herein disclosed techniques. The application service $204_1$ can also be configured to use various combinations of the EID, AID, and UID in JWT requests to the API service 210 (see step 324), such as described as pertains to FIG. 2. The application service $204_1$ developers can then generate a public-private key pair for secure encryption of communications (step 325), configure the private key to be used by the application service $204_1$ (see step 326), and configure the public key to be used by the API service 210 (see step 327). Such a public-private key implementation adds another layer of security. In some embodiments or practices, the operator of the API service 210 is the only holder the public key.

Figure 4A:
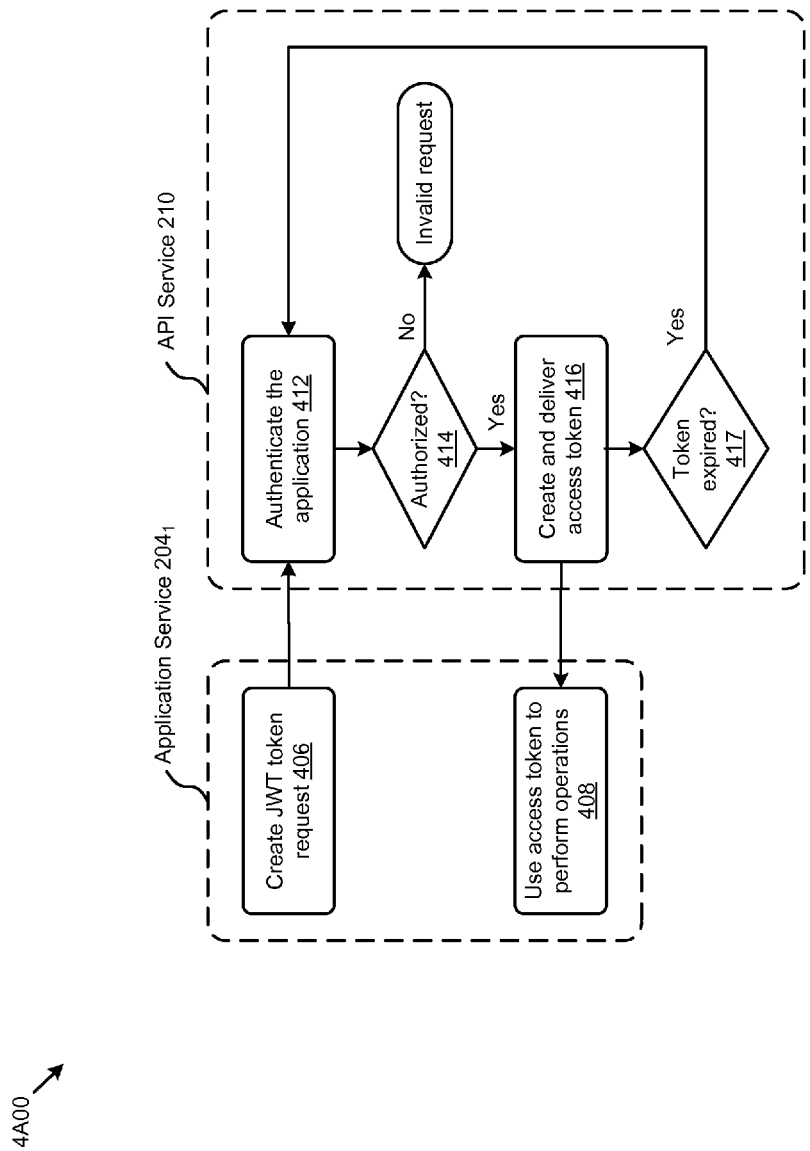
FIG. 4A is a flow diagram illustrating an access token request technique used by system components to access a cloud-based service platform using enterprise application authentication.

FIG. 4A is a flow diagram illustrating an access token request technique 4A00 used by system components to access a cloud-based service platform using enterprise application authentication. As an option, one or more instances of access token request technique 4A00 or any aspect thereof may be implemented in the context of the architecture and functionality of the embodiments described herein. Also, the access token request technique 4A00 or any aspect thereof may be implemented in any desired environment.

The access token request technique 4A00 shown in FIG. 4A comprises a set of operations that can be executed by the application service $204_1$ and the API service 210 described in FIG. 2. Additional or fewer steps and/or other allocations of operations are possible. Specifically, the access token request technique 4A00 can be used to authenticate and authorize an application to receive an access token to perform various operations in systems for accessing a cloud-based service platform using enterprise application authentication. For example, an enterprise access token can be provided to enable the application service $204_1$ to perform various user management tasks (e.g., application user creation), and a user access token can be provided to enable the application service $204_1$ to perform various user action operations (e.g., content access). More specifically, the enterprise access token request technique 4A00 can start with the application service $204_1$ creating a token request such as a JWT token request to be sent to the API service 210 (see step 406). For example, an enterprise access token request can comprise an EID and an AID, and a user access token request can comprise an AID and a UID. The API service 210 can receive the request and authenticate the application (see step 412). For example, the API service 210 can apply the public key provided by the application service $204_1$ owner and/or developer to read the encrypted JWT request and perform the authentication. The API service 210 can then determine if the application service $204_1$ is authorized for the requested grant (see decision 414). For example, the JWT structure comprising an authorization grant can be validated (e.g., valid signature, valid claims, etc.) to determine whether the issued request and/or whether or not the issuer is authorized. If the application service $204_1$ is not authorized, the API service 210 will report an invalid request. If the application service $204_1$ is authorized, the API service 210 can create and deliver an access token (see step 416) for the application service $204_1$ to perform various operations (see step 408). For example, API service 210 can create and deliver an enterprise access token for the application service $204_1$ to manage users, or a user access token for the application service $204_1$ to perform as a proxy to initiate or carry out actions invoked by a user. In one or more embodiments, the access token delivered can expire after a certain time period (e.g., expiration time) to provide additional communications security. In such cases, the API service 210 can monitor the access token to determine whether the token has expired (see decision 417). If the access token has expired, the API service 210 can repeat certain steps shown in the access token request technique 4A00 (e.g., step 412, step 414, and step 416) to generate a new access token to maintain the secure communications link between the application service $204_1$ and the API service 210 earlier established. Such a process of replacing expired tokens with newly created tokens can continue while the entities associated with the secure link (e.g., users, applications, enterprises, etc.) remain authenticated and authorized.

Figure 4B:
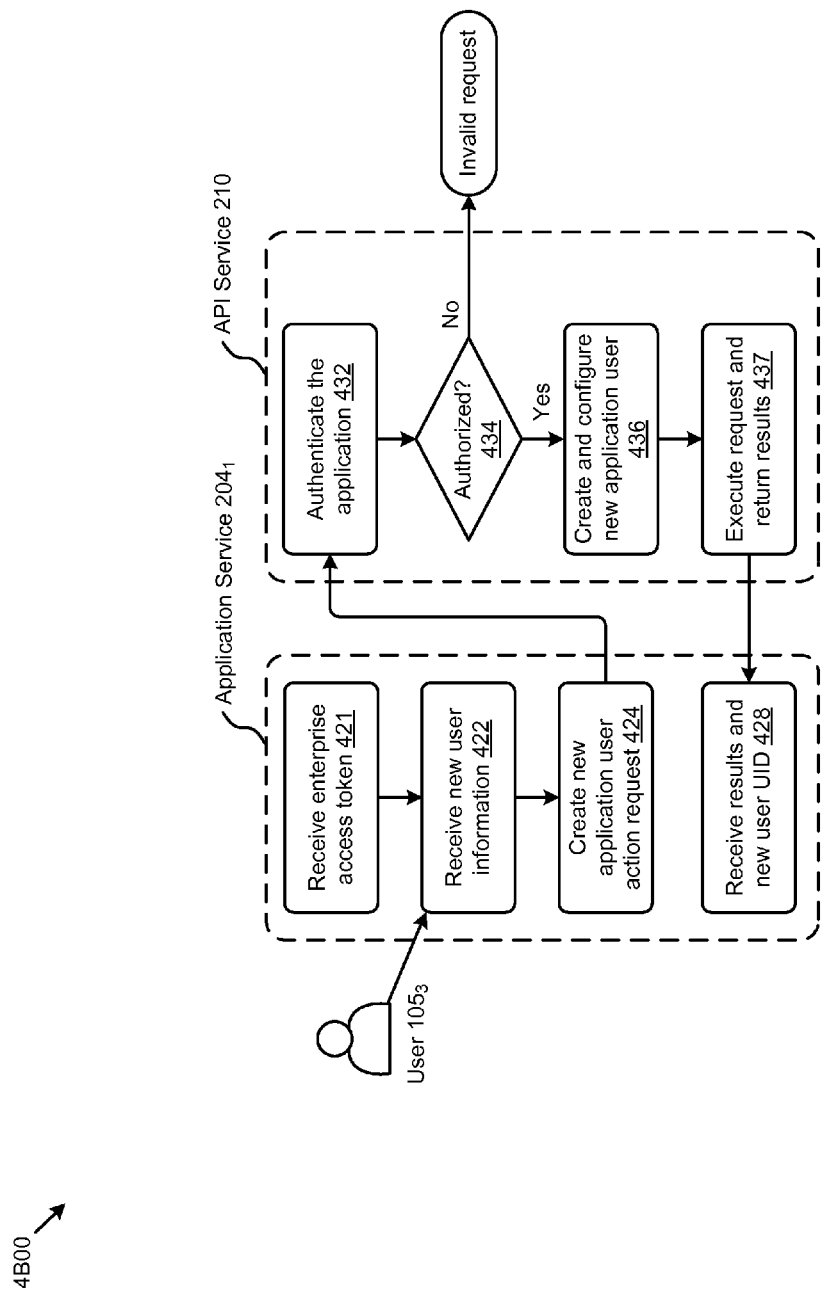
FIG. 4B depicts a flow diagram showing an application user creation approach as used in system components that access a cloud-based service platform using enterprise application authentication, according to some embodiments.

FIG. 4B depicts a flow diagram showing an application user creation approach 4B00 as used in system components that access a cloud-based service platform using enterprise application authentication. As an option, one or more instances of application user creation approach 4B00 or any aspect thereof may be implemented in the context of the architecture and functionality of the embodiments described herein. Also, the application user creation approach 4B00 or any aspect thereof may be implemented in any desired environment.

The application user creation approach 4B00 shown in FIG. 4B comprises a set of operations that can be executed by the application service $204_1$ and the API service 210 described in FIG. 2. Additional or fewer steps and/or other allocation of operations are possible. Specifically, the application user creation approach 4B00 can be used to create an application user in systems for accessing a cloud-based service platform using enterprise application authentication. More specifically, the application user creation approach 4B00 can start with the application service $204_1$ receiving a valid enterprise token (e.g., from the API service 210) to enable the application service $204_1$ to perform various user management operations (see step 421). The application service $204_1$ can then receive new user information from a user $105_3$ (see step 422). For example, the user $105_3$ can be visiting the application service $204_1$ for the first time and providing a name, an email address, a password, and other information in a first-time registration process. The user $105_3$ can also execute one or more actions (e.g., via a user interface presented by the application service $204_1$) that require access to an application workspace and application content managed by a content management platform (e.g., content management service 220 on content management server 110). In response to the aforementioned actions by the user $105_3$, the application service $204_1$ can generate a request to create a new application user (e.g., comprising a JWT claim) to send to the API service 210 associated with the content management platform (see step 424). The API service 210 will receive the request and authenticate the application (see step 432). The API service 210 can then determine if the application service $204_1$ is authorized for the requested grant (see decision 434). If the application service $204_1$ is not authorized, the API service 210 will report an invalid request. If the application service $204_1$ is authorized, the API service 210 can determine (e.g., from the JWT claims) that the request is associated with a new application user, and the API service 210 (e.g., using application user creation module 214) can create and configure a new application user profile, including a new unique user ID (see step 436). For example, the profile of a new application user (e.g., as compared to a new user) can be configured to have email notifications suppressed, to be auto-enrolled and/or validated, and to have terms of service automatically marked as satisfied. The API service 210 can then execute the request and return the results to the application service $204_1$ (see step 437) and the application service $204_1$ can receive the results and the newly generated UID to be used for other actions taken by the user $105_3$ (see step 428). In some cases, the results payload can comprise the new UID, and in other cases, the results payload can comprise the new UID and other information such as information for displaying an application user workspace and associated content that the user $105_3$ has permissions to view. The techniques described in FIG. 3, FIG. 4A, and FIG. 4B, serve to, in part, establish permissions and trust among certain logical levels comprising systems for accessing a cloud-based service platform using enterprise application authentication. Further details describing such logical levels and their relationships are disclosed as pertains to FIG. 4C1 and FIG. 4C2.

FIG. 4C1 presents logical diagram of an enterprise-to-application proxy technique 4C100 as used in systems for accessing a cloud-based service platform using enterprise application authentication. As an option, one or more instances of the enterprise-to-application proxy technique 4C100 or any aspect thereof may be implemented in the context of the architecture and functionality of the embodiments described herein. Also, the enterprise-to-application proxy technique 4C100 or any aspect thereof may be implemented in any desired environment.

As shown in FIG. 4C1, the enterprise-to-application proxy technique 4C100 can be illustrated by observing certain functional levels in some embodiments of systems for systems for accessing a cloud-based service platform using enterprise application authentication. Specifically, a content management level 440, an enterprise level 442, an application level 444, and a user level 446 are shown. The content management level 440 can comprise at least one instance of the content management server 110, and other components supporting a cloud-based content management platform. The enterprise level 442 can comprise multiple enterprise accounts (e.g., enterprise account $206_2$, . . . , to enterprise account $206_N$) that can each be managed by one or more administrators (e.g., administrator $405_1$, . . . , to administrator $405_N$). Certain respective enterprises can establish the enterprise accounts with the cloud-based content management platform, and receive certain permissions (see message 456) that characterize the scope of privileges made available to the enterprise account by the content management platform. Further, the application level 444 can comprise multiple applications (e.g., application $404_1$, . . . , to application $404_M$). As shown, in some embodiments, multiple applications (e.g., application $404_1$ and application $404_M$) can be associated with one enterprise account (e.g., enterprise account $206_N$). For example, a suite of health care applications might be associated with a single health care provider. Further, as shown, in other embodiments, multiple enterprise accounts (e.g., enterprise account $206_2$ and enterprise account $206_N$) can be associated with one application (e.g., application $404_1$). For example, a travel booking application might be associated with multiple lodging providers. In such cases, a given application can be given privileges determined by the enterprise account (see message 458). For example, the application can be authenticated and authorized to perform various enterprise-sponsored sessions, such as user management tasks (e.g., application user creation) and user action operations (e.g., content access). The application can further be provided certain privilege grants to allow the application to operate certain features of the content management platform. In some cases, privilege grants of a particular scope are granted to the application by the enterprise, and in other cases, such privilege grants of a different scope are provided to the application to operate on behalf of the enterprise.

Further, the application can be granted permissions and privileges to operate as a proxy on behalf of authorized users of the application. More specifically, referring to the user level 446 in FIG. 4C1, certain users can be authorized (e.g., registered) to use a given application, and each user provided a unique application user identifier (e.g., UID) according to the herein disclosed techniques. Upon registration, each user can be granted certain permissions (see message 460) that can be described by one or more roles, one or more collaboration groups, and other attributes associated with the user's UID. When permissions have been granted and trust established among the levels according to the techniques herein (e.g., using various combinations of the EID, AID, and UID in JWT requests), the application can operate as a proxy on behalf of the application user, yet without involvement by the enterprise account (e.g., administrator $405_4$). Specifically, for example, the application user can be authenticated by the application (e.g., using login credentials) and issue requests to the application (see message 462). The application can, in turn, be authenticated and authorized directly by the content management server 110 (see message 464). As such, user authorization is established and message 464 serves to communicate the issued request on behalf of the user.

FIG. 4C2 presents logical diagram of an application-to-enterprise proxy technique 4C200 as used in systems for accessing a cloud-based service platform using enterprise application authentication. As an option, one or more instances of the application-to-enterprise proxy technique 4C200 or any aspect thereof may be implemented in the context of the architecture and functionality of the embodiments described herein. Also, the application-to-enterprise proxy technique 4C200 or any aspect thereof may be implemented in any desired environment.

As shown in FIG. 4C2, the application-to-enterprise proxy technique 4C200 can be illustrated by observing certain functional levels in some embodiments of systems for systems for accessing a cloud-based service platform using enterprise application authentication. Specifically, a content management level 440, application level 444, an enterprise level 442, and a user level 446 are shown. The content management level 440 can comprise at least one instance of the content management server 110, and other components supporting a cloud-based content management platform. Strictly as one example, the content management server 110 can host a server-side application 441 or agent or API interface that interacts with components in the application level.

The application level 444 can comprise multiple applications (e.g., application $404_1$, . . . , to application $404_M$). The application can be authenticated and authorized to perform various enterprise-sponsored sessions, such as user management tasks (e.g., application user creation) and user action operations (e.g., content access). The application can further be provided certain privilege grants to allow the application to operate certain features of the content management platform. In the example of FIG. 4C2, privilege grants pertaining to the application are passed combined with enterprise permissions. In such cases, a given application can be given privileges determined by an enterprise administrator (see message 458), which privileges are passed to enterprise level components. For example, the application can be authenticated and authorized to perform various enterprise-sponsored sessions, such as user management tasks (e.g., application user creation) and user action operations. The application's privileges can be combined with enterprise permissions (see message 456). Still more, such combined privilege grants can be further combined with user permissions (see message 460). The user can be authenticated (e.g., using login credentials) and can then issue requests to the application (see message 462). The application can, in turn, be authenticated to and authorized by the content management server 110 (see message 464). As such, authorization for the user to access the authorized application is established. Message 464 serves to relay the issued request on behalf of the user.

In some cases, a user action operation is facilitates using services provided by the aforementioned server-side application 441 or agent or API interface.

Figure 4D:
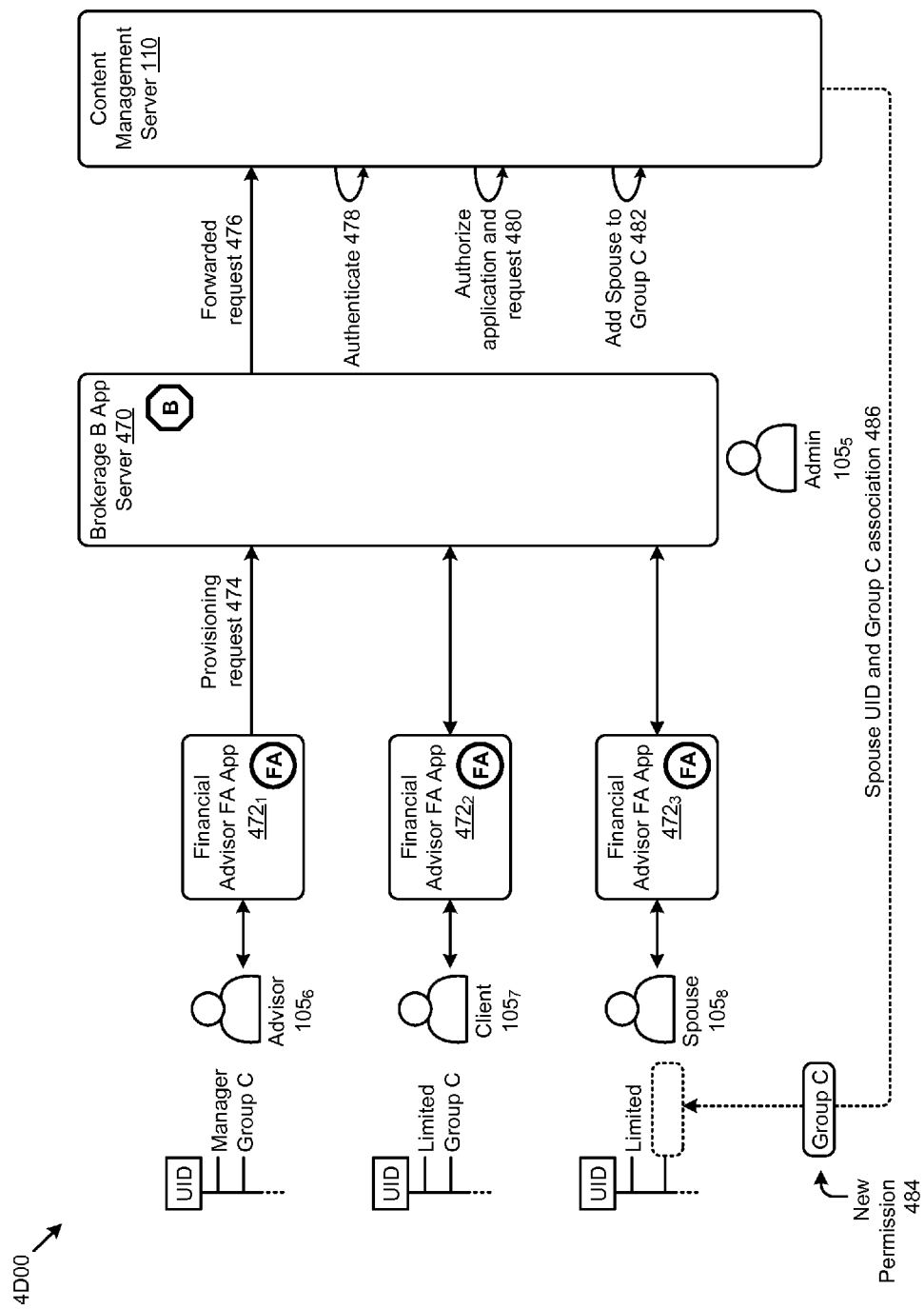
FIG. 4D depicts a diagram illustrating a real time provisioning technique as used in systems for accessing a cloud-based service platform using enterprise application authentication, according to some embodiments.

FIG. 4D depicts a diagram illustrating a real time provisioning technique 4D00 as used in systems for accessing a cloud-based service platform using enterprise application authentication. As an option, one or more instances of the real time provisioning technique 4D00 or any aspect thereof may be implemented in the context of the architecture and functionality of the embodiments described herein. Also, the real time provisioning technique 4D00 or any aspect thereof may be implemented in any desired environment.

As depicted in FIG. 4D, the real time provisioning technique 4D00 can be illustrated by the interaction of certain application users (e.g., advisor $105_6$, client $105_7$, and spouse $105_8$) with an application provided and branded by a financial advisory firm named "FA". Each user might interface with a respective instance of the application (e.g., financial advisor FA application $472_1$, financial advisor FA application $472_2$, and financial advisor FA application $472_3$). Further, a brokerage house "B" (e.g., operating a brokerage B application server 470) can establish an enterprise account with a cloud-based content management platform (e.g., operating, in part, on the content management server 110). The "FA" application is linked to the brokerage house application(s), and the linkage provides the mechanism for a "FA" application to receive granted permissions by the brokerage house "B" to perform various enterprise-sponsored sessions with the cloud-based content management platform. Such enterprise-sponsored sessions may host user management tasks (e.g., application user creation, etc.) and user action operations (e.g., provisioning, content access, etc.).

Specifically, the shown application users might have been setup (see FIG. 4B) with a respective UID and associated attributes (e.g., roles, groups, etc.) that, in part, can define certain permissions of each application user. For example, the advisor $105_6$ might be given a "manager" role to enable various actions related to the clients of the advisor $105_6$. The client $105_7$ might be given a "limited" role to control the scope of actions the client $105_7$ can perform in the application. If the client $105_7$ is a client of the advisor $105_6$, they may further be associated with the same "Group C". Such group attributes can be used by the content management platform to enable collaboration and sharing of content in various workspaces. The spouse $105_8$ of client $105_7$ might also have been setup with a UID and a "Limited" role, yet not assigned a group attribute.

A need might exist to provide access to certain documents to the spouse $105_8$ of client $105_7$. For example, the spouse $105_8$ might need to review and sign a beneficiary designation provided by the client $105_7$. In this case, according to the real time provisioning technique 4D00 shown in FIG. 4D and other techniques described herein, the advisor $105_6$ can issue a provisioning request (see message 474) that can be forwarded by the enterprise account (see message 476) to the content management server 110. In this case, according to the herein disclosed techniques, the application user (e.g., advisor $105_6$) can issue such a real time provisioning request from the enterprise application (e.g., financial advisor FA application $472_1$) with interaction by the enterprise account (e.g., administrator $405_5$). The content management server 110 can authenticate the application (see operation 478) and authorize the application and request (see operation 480). For example, using the herein disclosed techniques, the content management server 110 can validate the financial advisor FA application has been authorized by the enterprise account to make requests on behalf of the brokerage B enterprise account and the advisor $105_6$. The specific request can further be checked to validate whether the advisor $105_6$ is permitted to execute such a request. For example, the attributes associated with the UID of the advisor $105_6$ can be checked for a proper level of authority required for the request. When the application and request have been authenticated and authorized, the spouse $105_8$ can be added to "Group C" (see operation 482) by establishing an association between "Group C" and the UID of the spouse $105_8$ (see message 486). Such a new permission 484 can avail the spouse $105_8$ to certain documents (e.g., beneficiary form) shared among members of "Group C".

Figure 5A:
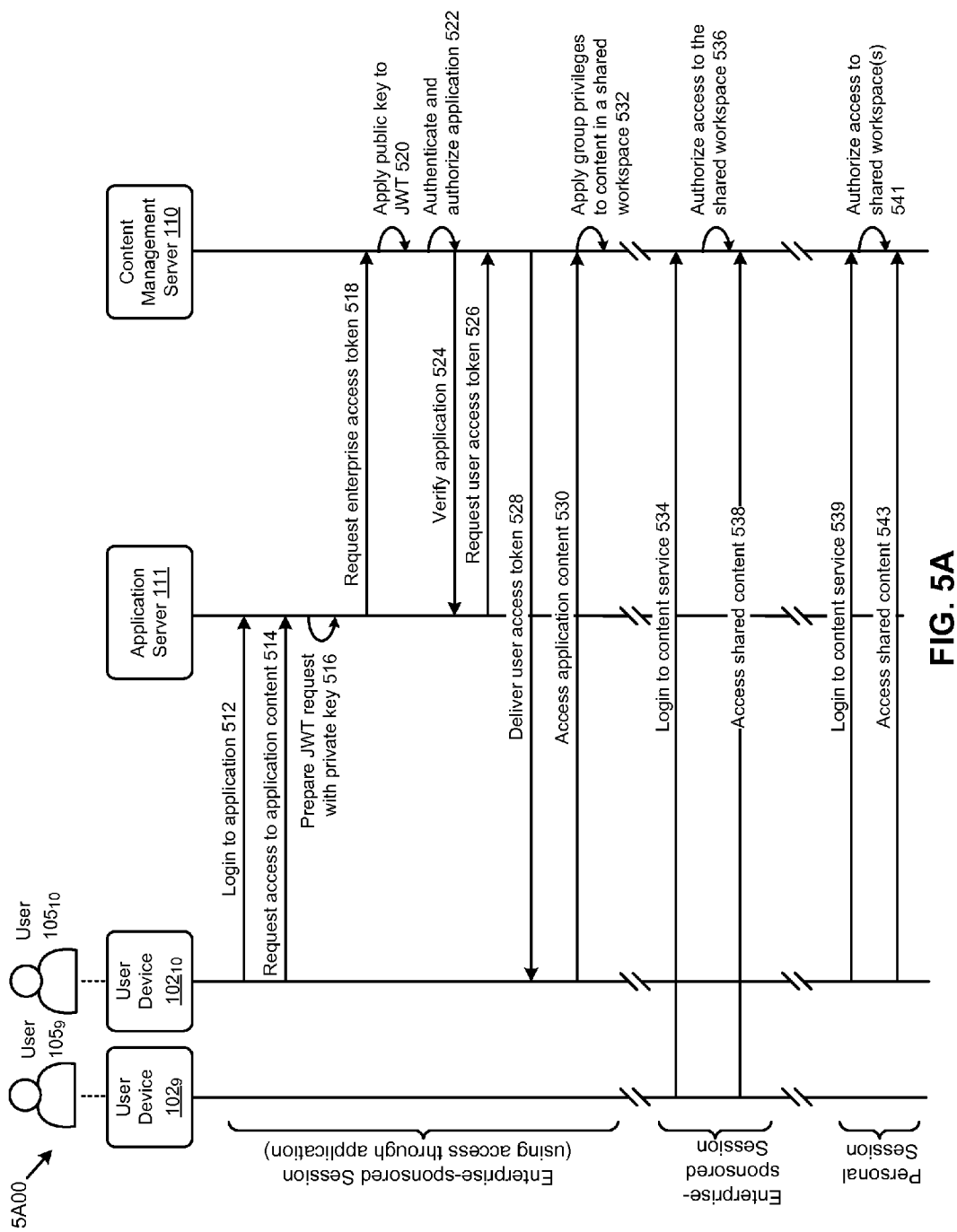
FIG. 5A presents a protocol to implement application user authentication and access privileges in systems that access a cloud-based service platform using enterprise application authentication, according to some embodiments.

Another example and embodiment for applying content viewing permissions and privileges to multiple users is described as pertains to FIG. 5A.

FIG. 5A presents a protocol 5A00 to implement application user authentication and access privileges in systems that access a cloud-based service platform using enterprise application authentication. As an option, one or more instances of protocol 5A00 or any aspect thereof may be implemented in the context of the architecture and functionality of the embodiments described herein. Also, the protocol 5A00 or any aspect thereof may be implemented in any desired environment.

In one embodiment, the user $105_9$ at the user device $102_9$, the user $105_{10}$ at the user device $102_{10}$, the application server 111, and the content management server 110 can exhibit a set of high-level interactions (e.g., operations, messages, etc.) in the protocol 5A00. Specifically, the user $105_{10}$ can use the protocol 5A00 for accessing a cloud-based service platform using enterprise application authentication and shared content with the user $105_9$. As shown, the user $105_{10}$ can login to an application (e.g., associated with an enterprise) operated by the application server 111 (see message 512). The user $105_{10}$ can request access to content related to the application (see message 514). The application operated by the application server 111 can respond by preparing a JWT request with a private key (see operation 516) to request an access token from the content management server 110 (see message 518). A service operated by the content management server 110 (e.g., the API service 210) can apply a public key (e.g., provided by the enterprise) to the JWT request (see operation 520) and authenticate and authorize the application and request claims (see operation 522). The content management server 110 can verify the application (see message 524) and the application at the application server 111 can respond by requesting a user access token (see message 526). The content management server 110 can deliver the user access token (see message 528) allowing secure access to application content (e.g., via an application user workspace) to the user $105_{10}$ (see message 530). For example, the user $105_{10}$ might be an automobile insurance customer who is uploading photographs of an accident through an application provided by the insurance company (e.g., the enterprise associated with the application operating on the application server 111). In this example, the photographs can be shared with the customer's agent and assigned claims administrator (e.g., user $105_9$), and group collaboration (e.g., viewing, downloading, etc.) privileges can be applied to the content (see operation 532). At some later time, the user $105_9$ can also directly login into the content management service (see message 534). For example, the user $105_9$ can be an internally employed claims administrator (e.g., a "managed user") at the insurance company (e.g., the enterprise associated with the application operating on the application server 111) and, as such, granted permissions to access shared content (e.g., uploaded accident photographs) directly through the content management platform. The user $105_9$ can then be authorized to access a shared workspace (see operation 536) and proceed to access (e.g., view, download, etc.) the shared content (see message 538). In this case, both users are accessing the same content through different interfaces: the user $105_9$ accessing through the content management service application, and the user $105_{10}$ accessing through the application communicating with the API service (e.g., API service 210) of the content management platform. At another time, the user $105_9$ can login from a personal account (see message 539), become authorized to access shared workspaces (see operation 541), and proceed to access (e.g., view, download, etc.) the shared content (see message 543). The aforementioned shared workspaces can be limited to shared content within the personal account, or can include shared content that originates from other workspaces to which the user $105_9$ can be granted access (e.g., see operation 536).

Figure 5B:
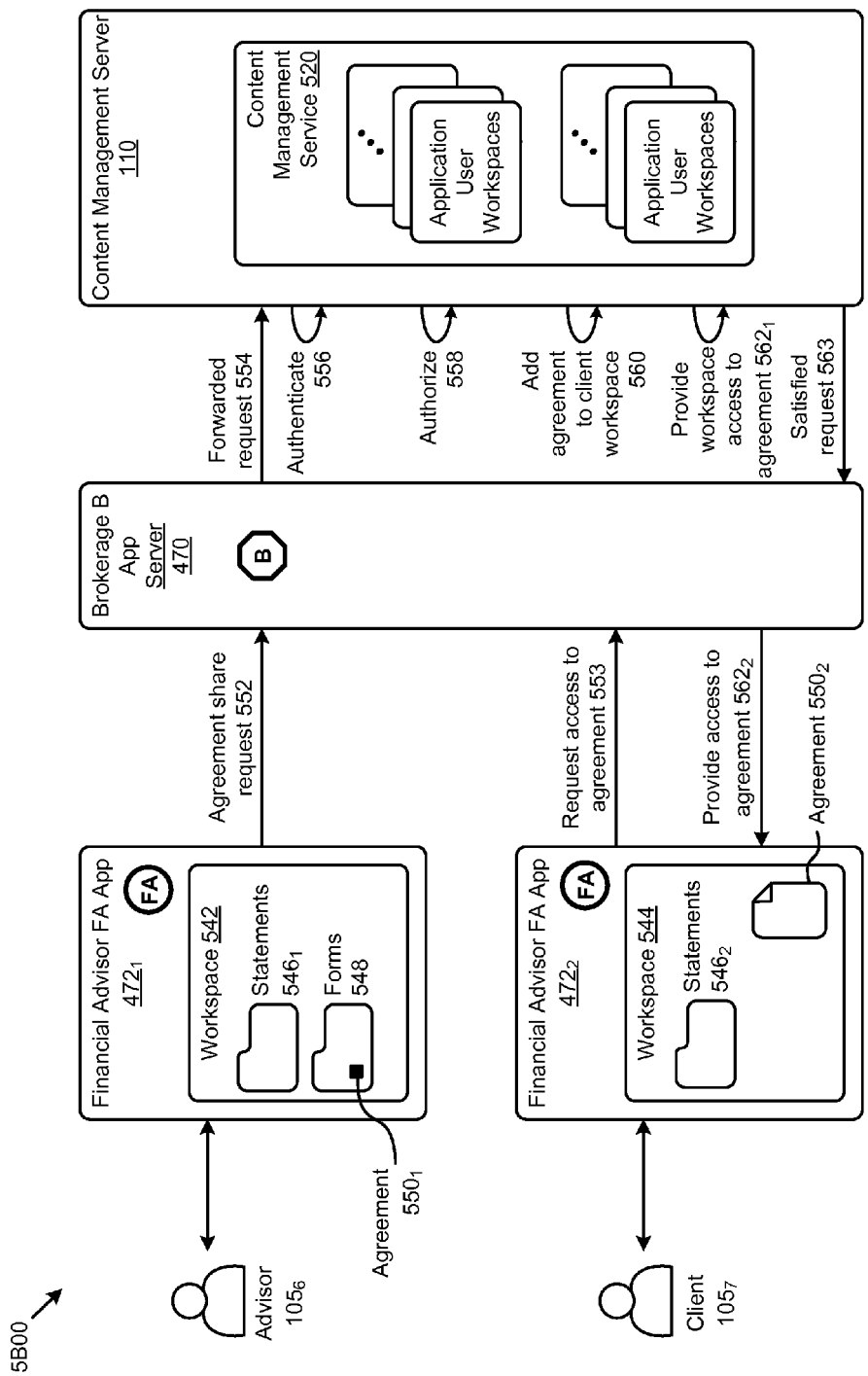
FIG. 5B and FIG. 5C depict document sharing techniques as used in systems for accessing a cloud-based service platform using enterprise application authentication.
Figure 5C:
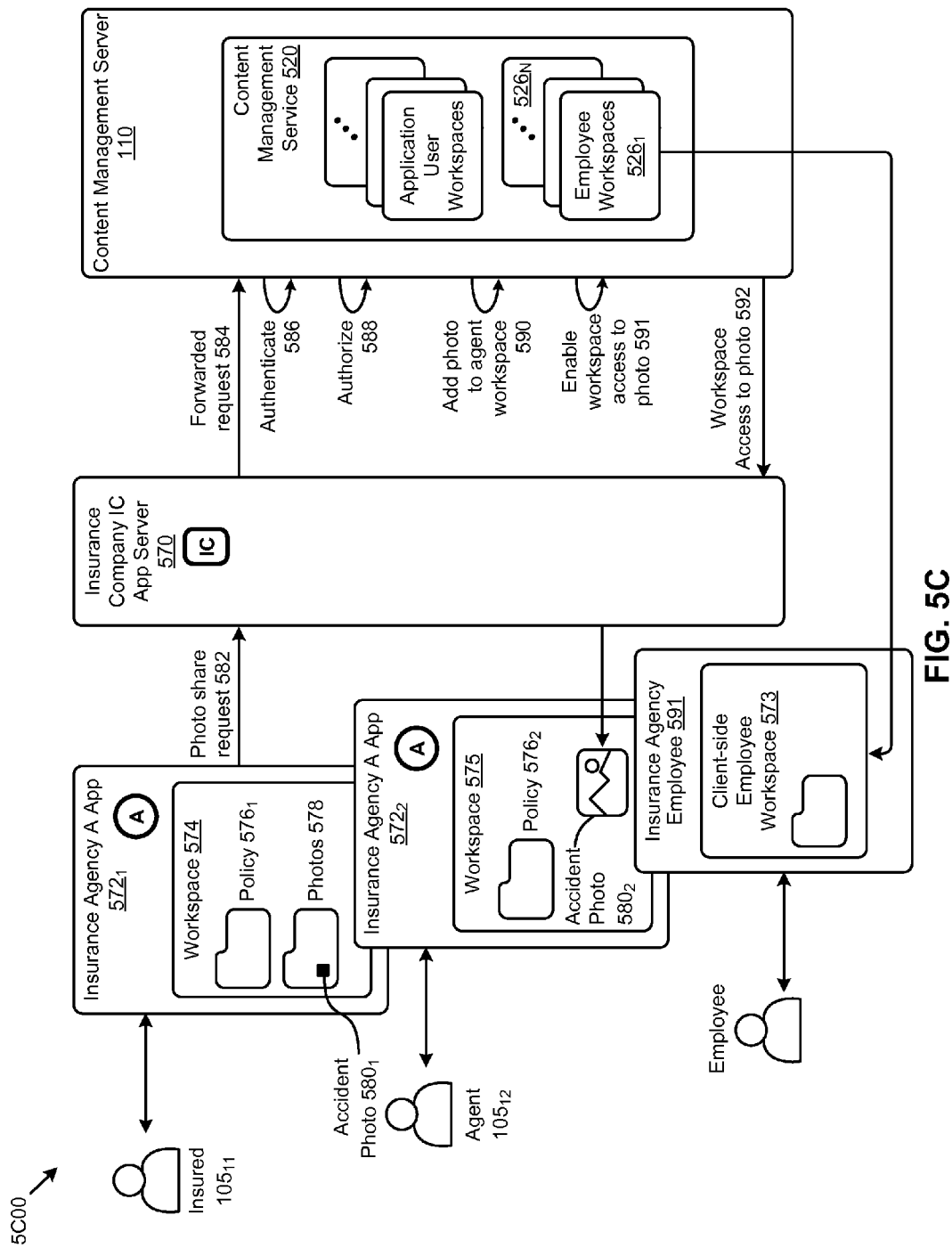

Further examples and embodiments illustrating the herein disclosed techniques for accessing a cloud-based service platform using enterprise application authentication are described as pertains to FIG. 5B and FIG. 5C.

FIG. 5B depicts a diagram illustrating a document sharing technique 5B00 as used in systems for accessing a cloud-based service platform using enterprise application authentication. As an option, one or more instances of the document sharing technique 5B00 or any aspect thereof may be implemented in the context of the architecture and functionality of the embodiments described herein. Also, the document sharing technique 5B00 or any aspect thereof may be implemented in any desired environment.

FIG. 5B comprises the advisor $105_6$, the client $105_7$, the instance of the financial advisor FA application $472_1$, the instance of the financial advisor FA application $472_2$, the brokerage B application server 470, and the content management server described hereinabove. FIG. 5B further depicts a workspace 542 accessible by the advisor $105_6$ in the financial advisor FA application $472_1$. The workspace 542 of advisor $105_6$ comprises an instance of certain documents or personal financial statements (e.g., statements $546_1$) shared with the client $105_7$, and forms 548. Further shown, is a workspace 544 accessible by the client $105_7$ in the financial advisor FA application $472_2$. The workspace 544 of client $105_7$ comprises an instance of certain personal financial statements (e.g., statements $546_2$) shared with the advisor $105_6$.

In one example, the advisor $105_6$ might have an agreement (e.g., agreement $550_1$) that the client $105_7$ needs to review and sign. In this case, using the herein disclosed techniques, the advisor $105_6$ can issue an agreement share request (see message 552) that can be forwarded by the enterprise account (see message 554) to the content management server 110. The content management server 110 can authenticate the application (see operation 556) and authorize the application and its request (see operation 558). When the application and request have been authenticated and authorized, an instance or representation (e.g., a preview) of the agreement (e.g., agreement $550_2$) can be added to the client workspace (see operation 560) by providing the workspace 544 access to the agreement (see message $562_1$). At some moment in time, a client $105_7$ might click on a folder or otherwise request access to the agreement (see message 553). A message to provide access to the agreement is forwarded to the workspace 544 (see message $562_2$), possibly together with an instance of the agreement $550_2$. The share request is satisfied by the content management server (see message 563).

FIG. 5C depicts a diagram illustrating a content sharing technique 5C00 as used in systems for accessing a cloud-based service platform using enterprise application authentication. As an option, one or more instances of the content sharing technique 5C00 or any aspect thereof may be implemented in the context of the architecture and functionality of the embodiments described herein. Also, the content sharing technique 5C00 or any aspect thereof may be implemented in any desired environment.

As depicted in FIG. 5C, the content sharing technique 5C00 can be illustrated by the interaction of certain application users (e.g., insured $105_{11}$ and agent $105_{12}$) with an application provided and branded by an insurance agency named "A". Each user might interface with a respective instance of the application (e.g., insurance agency A application $572_1$, and insurance agency A application $572_2$). Further, an insurance company "IC" (e.g., an enterprise that operates the shown insurance company IC application server 570) can establish an enterprise account with a cloud-based content management platform (e.g., that operates, at least in part, on the content management server 110). The "A" application can be further granted permissions by the insurance company "IC" to perform various enterprise-sponsored sessions with the cloud-based content management platform according to the herein disclosed techniques, such as user management tasks (e.g., application user creation, etc.) and user action operations (e.g., provisioning, content access, etc.). FIG. 5C further depicts a workspace 574 accessible by the insured $105_{11}$ in the insurance agency A application $572_1$. The workspace 574 of the insured $105_{11}$ comprises an instance of a policy (e.g., policy $576_1$) shared with the agent $105_{12}$, and photos 578 (e.g., from a recent accident). Further shown, is a workspace 575 accessible by the agent $105_{12}$ in the insurance agency A application $572_2$. The workspace 575 of agent $105_{12}$ comprises an instance of the policy (e.g., policy $576_2$) shared with the insured $105_{11}$.

In one example, the insured $105_{11}$ might have a photo (e.g., accident photo $580_1$) that the agent $105_{12}$ needs to review and have stored for auditing purposes. In this case, using the herein disclosed techniques, the insured $105_{11}$ can issue a photo share request (see message 582) that can be forwarded by the enterprise account (see message 584) to the content management server 110. The content management server 110 can authenticate the application (see operation 586) and authorize the application and request (see operation 588). When the application and request have been authenticated and authorized, an instance of the photo (e.g., accident photo $580_2$) can be added to the agent workspace (see operation 590) by providing the workspace 575 access to the photo (see operation 591 and message 592). An instance of the accident photo $580_2$ can be seen by the agent by operation of the workspace 575.

The insurance company may engage with the provider of the content management server 110 to provide access for employees. As shown, the content management server 110 provisions employee workspaces (e.g., employee workspaces 526₁, employee workspaces 526_N, client-side employee workspaces 573). Such workspaces can be accessed by employees even without going through the insurance agency A application and even without going through the insurance company IC application server 570.

ADDITIONAL EMBODIMENTS OF THE DISCLOSURE

Additional Practical Application Examples

Figure 6A:
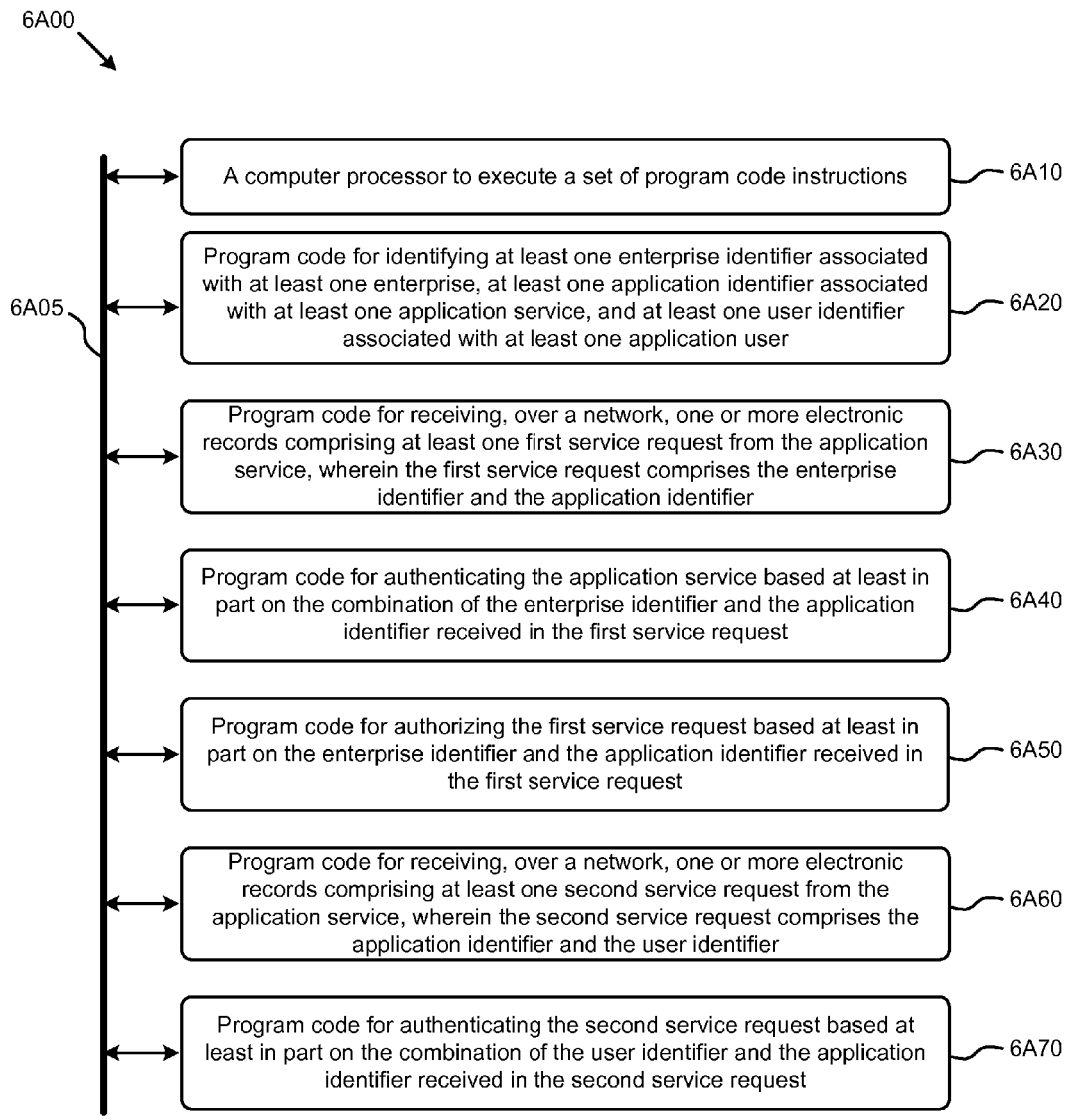
FIG. 6A and FIG. 6B depict systems as an arrangement of computing modules that are interconnected so as to operate cooperatively to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the present system 6A00 may be implemented in the context of the architecture and functionality of the embodiments described herein. Of course, however, the system 6A00 or any operation therein may be carried out in any desired environment. As shown, the system 6A00 comprises a processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising a computer processor to execute a set of program code instructions (see module 6A10) and modules for accessing memory to hold program code instructions to perform: identifying at least one enterprise identifier associated with at least one enterprise, at least one application identifier associated with at least one application service, and at least one user identifier associated with at least one application user (see module 6A20); receiving, over a network, one or more electronic records comprising at least one first service request from the application service, wherein the first service request comprises the enterprise identifier and the application identifier (see module 6A30); authenticating the application service based at least in part on the combination of the enterprise identifier and the application identifier received in the first service request (see module 6A40); authorizing the first service request based at least in part on the enterprise identifier and the application identifier received in the first service request (see module 6A50) receiving, over a network, one or more electronic records comprising at least one second service request from the application service, wherein the second service request comprises the application identifier and the user identifier (see module 6A60); authenticating the second service request based at least in part on the combination of the user identifier and the application identifier received in the second service request (see module 6A70).

Some embodiments use the components of system 6A00 to implement a content management system having an enterprise server accessible by an enterprise user using an enterprise user credential wherein the enterprise server executes a content access application having an assigned application identifier. The content management system is accessed by the enterprise user using a content access user credential that is different from the enterprise user credential. An application programming interface is provided to allow the enterprise user access to the shared storage facility. The application programming interface can implement a plurality of security and access functions. For example, a first function of the application programming interface generates the content access user credential using at least a portion of the enterprise user credential, and a second function of the application programming interface allows the content access application to serve as a proxy for the enterprise user after authenticating the content access application using a combination of the content access user credential and the assigned application identifier.

The application programming interface is configured to allow an enterprise user secure access to a separate shared storage facility when the enterprise user holds an enterprise user credential but does not hold an access credential for the separate shared storage facility. For example, a first application programming interface function generates a content access user credential using at least a portion of the enterprise user credential, and then a second function of the application programming interface allows a pre-configured content access application to serve as a proxy for the enterprise user after authenticating the content access application using a combination of the content access user credential and an application identifier assigned to the content access application.

Figure 6B:
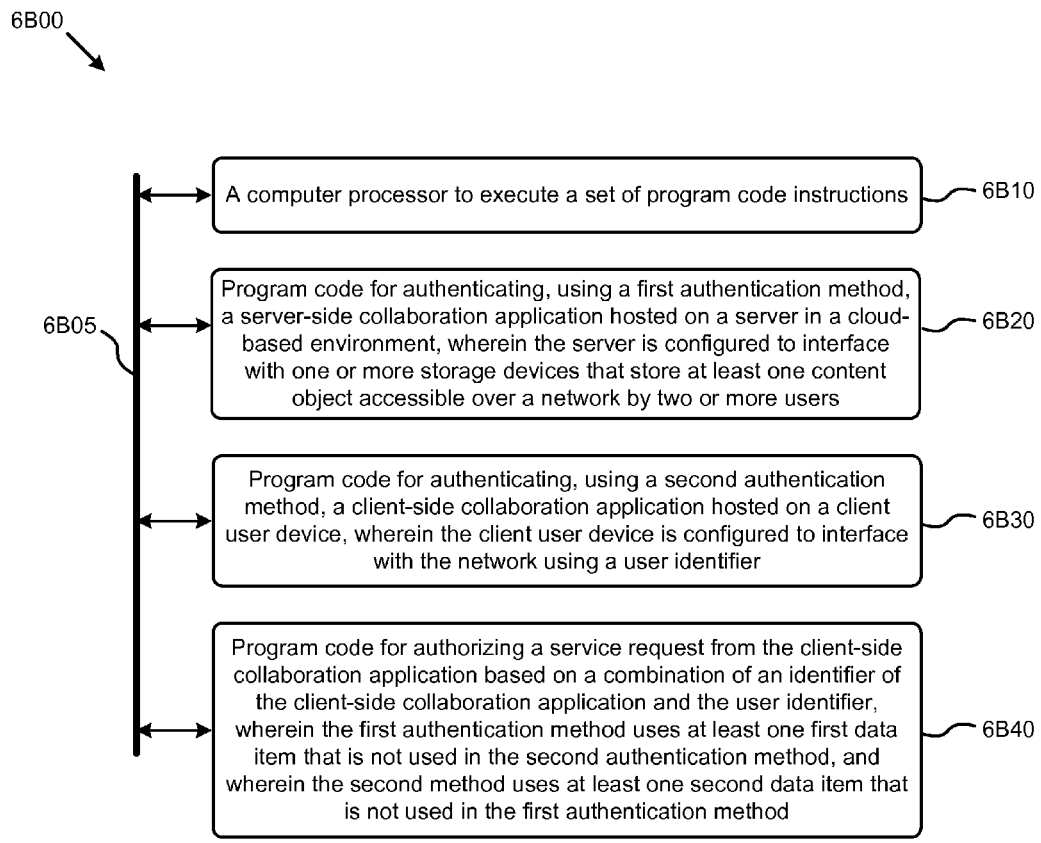

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the present system 6B00 may be implemented in the context of the architecture and functionality of the embodiments described herein. Of course, however, the system 6B00 or any operation therein may be carried out in any desired environment.

As shown, the system 6B00 comprises a processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising a computer processor to execute a set of program code instructions (see module 6B 10) and modules for accessing memory to hold program code instructions to perform: authenticating, using a first authentication method, a server-side collaboration application hosted on a server in a cloud-based environment, wherein the server is configured to interface with one or more storage devices that store at least one content object accessible over a network by two or more users (see module 6B20); authenticating, using a second authentication method, a client-side collaboration application hosted on a client user device, wherein the client user device is configured to interface with the network using a user identifier (see module 6B30); and authorizing a service request from the client-side collaboration application based on a combination of an identifier of the client-side collaboration application and the user identifier, wherein the first authentication method uses at least one first data item that is not used in the second authentication method, and wherein the second method uses at least one second data item that is not used in the first authentication method (see module 6B40).

SYSTEM ARCHITECTURE OVERVIEW

Additional System Architecture Examples

Figure 7A:
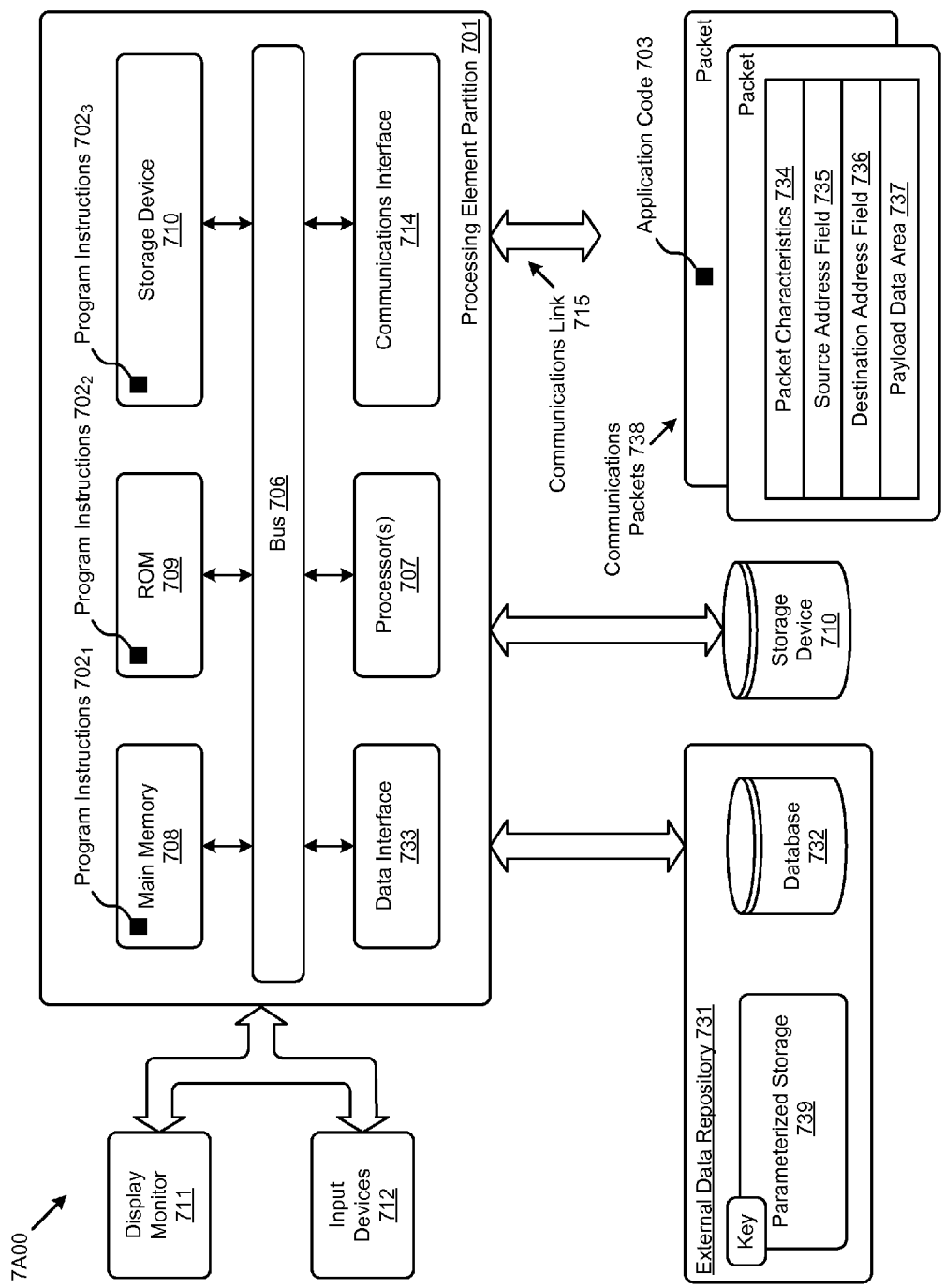
FIG. 7A and FIG. 7B depict exemplary architectures of components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a CPU, or a multi-core CPU (e.g., data processor 707), a system memory (e.g., main memory 708, or an area of random access memory RAM), a non-volatile storage device or non-volatile storage area (e.g., ROM 709), an internal or external storage device 710 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 7A00 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) communications packets 738 comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 7A00. According to certain embodiments of the disclosure, two or more instances of computer system 7A00 coupled by a communications link 715 (e.g., LAN, PTSN, or wireless network) may perform the sequence of instructions required to practice embodiments of the disclosure using two or more instances of components of computer system 7A00.

The computer system 7A00 may transmit and receive messages such as data and/or instructions organized into a data structure (e.g., communications packets 738). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the performance characteristics of accessing a cloud-based service platform using enterprise application authentication.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of accessing a cloud-based service platform using enterprise application authentication). Such files or records can be brought into and/or stored in volatile or non-volatile memory.

Figure 7B:
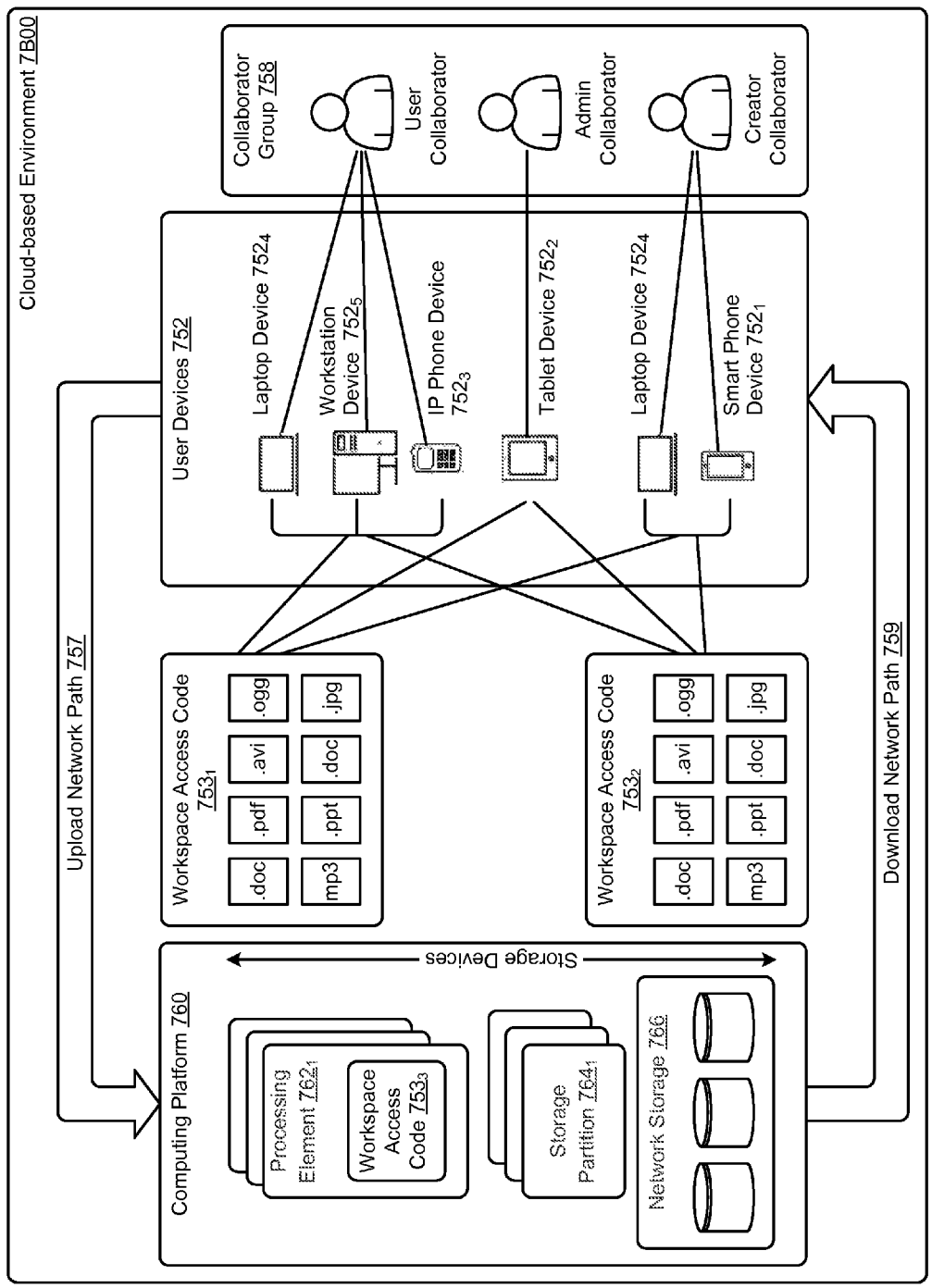

FIG. 7B depicts a block diagram of an instance of a cloud-based environment 7B00. Such a cloud-based environment supports access to workspaces through the execution of workspace access code (e.g., workspace access code 753$_1$ and workspace access code 753$_2$. Workspace access code can be executed on any of the shown user devices 752 (e.g., laptop device 752$_4$, workstation device 752$_5$, IP phone device 752$_3$, tablet device 752$_2$, smart phone device 752$_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform (e.g., computing platform 760), including in a middleware setting. As shown, a portion of the workspace access code (e.g., workspace access code 753$_3$) resides in and can be executed on one or more processing elements (e.g., processing element 762$_1$). The workspace access code can interface with storage devices such the shown networked storage 766. Storage of workspaces and/or any constituent files or objects, and/or any other code or scripts or data can be stored in any one or more storage partitions (e.g., storage partition 764$_1$). In some environments, a processing element includes forms of storage, such as RAM and/or ROM and/or FLASH, and/or other forms of volatile and non-volatile storage.

A stored workspace can be populated via an upload (e.g., an upload from a user device to a processing element over an upload network path 757 or network port). One or more constituents of a stored workspace can be delivered to a particular user and/or shared with other particular users via a download (e.g., a download from a processing element to a user device over a download network path 759 or network port).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   identifying a server in a cloud-based environment, wherein the server is configured to interface with one or more storage devices associated with a content management service on a content management server, the one or more storage devices storing at least one content object accessible over a network by two or more users,
   forming an enterprise identifier associated with an enterprise, an application identifier associated with an application service, and a user identifier associated with an application user, wherein the application user is one of the two or more users;
   receiving, over the network, one or more electronic records comprising at least one first service request to the content management server from the application service, wherein the first service request comprises the user identifier and the application identifier;
   initiating, on the server, a request that authenticates the application service with the content management service on the content management server based at least in part on the combination of the user identifier and the application identifier received in the first service; and
   authorizing the first service request based at least in part on the user identifier received in the first service request.

2. The method of claim 1, further comprising:
   receiving, over the network, one or more electronic records comprising at least one second service request from the application service, wherein the second service request comprises the enterprise identifier and the application identifier;
   authenticating the application service based at least in part on the combination of the enterprise identifier and the application identifier received in the second service request; and
   authorizing the second service request based at least in part on the enterprise identifier and the application identifier received in the second service request.

3. The method of claim 1, wherein the authorizing the first service request is based at least in part on the enterprise identifier that is mapped from the application identifier.

4. The method of claim 1, further comprising issuing an access token to the application service in response to acts of authorizing the first service request.

5. The method of claim 4, wherein the access token is valid until an expiration time.

6. The method of claim 1, further comprising:
   identifying a shared common user accounts database;
   authenticating, using the shared common user accounts database, a first user to access a first application; and authenticating, using the shared common user accounts database, a second user to access a second application.

7. The method of claim 1, further comprising creating an application user profile associated with the application user on the server, wherein the application user profile comprises at least the user identifier.

8. The method of claim 1, further comprising performing auditing operations using the user identifier.

9. The method of claim 1, wherein the first service request is encrypted with a public-private key pair.

10. The method of claim 1, wherein the enterprise does not receive a client secret.

11. A computer program product, embodied in a non-transitory computer readable medium, the non-transitory computer readable medium having stored thereon a sequence of instructions which, when stored in memory and executed by a processor causes the processor to perform a set of acts, the acts comprising:
identifying a server in a cloud-based environment, wherein the server is configured to interface with one or more storage devices associated with a content management service on a content management server, the one or more storage devices storing at least one content object accessible over a network by two or more users;
forming an enterprise identifier associated with an enterprise, an application identifier associated with an application service, and a user identifier associated with an application user, wherein the application user is one of the two or more users;
receiving, over the network, one or more electronic records comprising at least one first service request to the content management server from the application service, wherein the first service request comprises the user identifier and the application identifier;
initiating, on the server, a request that authenticates the application service with the content management service on the content management server based at least in part on the combination of the user identifier and the application identifier received in the first service; and
authorizing the first service request based at least in part on the user identifier received in the first service request.

12. The computer program product of claim 11, further comprising:
receiving, over the network, one or more electronic records comprising at least one second service request from the application service, wherein the second service request comprises the enterprise identifier and the application identifier;
authenticating the application service based at least in part on the combination of the enterprise identifier and the application identifier received in the second service request; and
authorizing the second service request based at least in part on the enterprise identifier and the application identifier received in the second service request.

13. The computer program product of claim 11, wherein the authorizing the first service request is based at least in part on the enterprise identifier that is mapped from the application identifier.

14. The computer program product of claim 11, further comprising instructions which, when loaded into the memory and executed by the processor, cause the processor to perform acts of issuing an access token to the application service in response to acts of authorizing the first service request.

15. The computer program product of claim 11, further comprising instructions which, when loaded into the memory and executed by the processor, cause the processor to perform acts of:
identifying a shared common user accounts database;
authenticating, using the shared common user accounts database, a first user to access a first application; and
authenticating, using the shared common user accounts database, a second user to access a second application.

16. The computer program product of claim 11, further comprising instructions which, when loaded into the memory and executed by the processor, cause the processor to perform acts of creating an application user profile associated with the application user, wherein the application user profile comprises at least the user identifier.

17. The computer program product of claim 11, wherein the first service request is encrypted with a public-private key pair.

18. The computer program product of claim 11, wherein the enterprise does not receive a client secret.

19. A system comprising:
a server in a cloud-based environment, wherein the server is configured to interface with one or more storage devices associated with a content management service on a content management server, the one or more storage devices storing at least one content object accessible over a network by two or more users; and
a processor having instructions which, when loaded into a memory and executed by the processor, cause the processor to perform acts of:
forming an enterprise identifier associated with an enterprise, an application identifier associated with an application service, and a user identifier associated with an application user, wherein the application user is one of the two or more users;
receiving, over the network, one or more electronic records comprising at least one first service request from the application service to the content management server, wherein the first service request comprises the user identifier and the application identifier;
initiating, on the server, an application user access request that authenticates the application service based at least in part on sending the combination of the user identifier and the application identifier received in the first service request to the content management server; and
authorizing the first service request based at least in part on the user identifier received in the first service request.

20. The system of claim 19, further comprising:
a network port to receive, over the network, one or more electronic records comprising at least one second service request from the application service, wherein the second service request comprises the enterprise identifier and the application identifier; and
a memory to store instructions that when executed by the processor, cause the processor to perform acts of:
authenticating the application service based at least in part on the combination of the enterprise identifier and the application identifier received in the second service request; and
authorizing the second service request based at least in part on the enterprise identifier and the application identifier received in the second service request.

21. A method comprising:
authenticating, using a first authentication method, a server-side collaboration application hosted on a server in a cloud-based environment, wherein the server is configured to interface with one or more storage devices that store at least one content object accessible over a network by two or more users;

authenticating, using a second authentication method, a client-side collaboration application hosted on a client user device, wherein the client user device is configured to interface with the network using a user identifier; and authorizing a service request from the client-side collaboration application based on a combination of an identifier of the client-side collaboration application and the user identifier, wherein the service request itself is authenticated directly by a content management server, wherein the first authentication method uses at least one first data item that is not used in the second authentication method, and wherein the second method uses at least one second data item that is not used in the first authentication method.

22. The method of claim 21, wherein at least one first data item comprises at least a portion of an enterprise credential, which portion is not passed to the client user device.

23. The method of claim 21, wherein at least one second data item comprises at least a portion of a user credential, which portion is not passed to the server in the cloud-based environment.

24. The method of claim 23, wherein the second authentication method comprises:
identifying a shared common user accounts database that comprises at least a portion of a user credential pertaining to a first user and that comprises at least a portion of a user credential pertaining to a second user;
authenticating, using the shared common user accounts database, the first user to access the client-side collaboration application; and
authenticating, using the shared common user accounts database, the second user to access a second client-side collaboration application.

* * * * *